United States Patent
Storm

(10) Patent No.: US 9,992,200 B2
(45) Date of Patent: *Jun. 5, 2018

(54) SYSTEM AND METHOD FOR SECURE CONTENT SHARING AND SYNCHRONIZATION

(71) Applicant: Open Text SA ULC, Halifax (CA)

(72) Inventor: James Storm, Waterloo (CA)

(73) Assignee: Open Text SA ULC, Halifax, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/653,200

(22) Filed: Jul. 18, 2017

(65) Prior Publication Data

US 2017/0318017 A1 Nov. 2, 2017

Related U.S. Application Data

(63) Continuation of application No. 15/413,601, filed on Jan. 24, 2017, now Pat. No. 9,749,327, which is a
(Continued)

(51) Int. Cl.
*G06F 7/04* (2006.01)
*H04L 29/06* (2006.01)
(Continued)

(52) U.S. Cl.
CPC .............. *H04L 63/10* (2013.01); *H04L 63/08* (2013.01); *G06Q 30/01* (2013.01)

(58) Field of Classification Search
CPC ........... G06F 17/30165; H04L 63/0807; H04L 67/1095; H04L 67/34
See application file for complete search history.

(56) References Cited

U.S. PATENT DOCUMENTS 7,921,353 B1 * 4/2011 Murray ............. G06F 17/30893
707/722
8,103,742 B1 * 1/2012 Green ............... G06F 17/30893
709/218
(Continued)

FOREIGN PATENT DOCUMENTS

EP      2290536 A2    3/2011

OTHER PUBLICATIONS

International Search Report and Written Opinion issued for PCT/IB2012/002473, dated Oct. 4, 2013, 23 pages.
(Continued)

*Primary Examiner* — Gary S Gracia
(74) *Attorney, Agent, or Firm* — Sprinkle IP Law Group

(57) ABSTRACT

A flexible content sharing system may comprise a network based application built on a client device using information from dissociated user experience component (UXC), application logic and execution layer (ALEL), and content distribution system (CDS) payloads. An ALEL engine may communicate a request from the network based application to a CDS module. The CDS module may interface the ALEL engine and a CDS server. The ALEL engine can act as a gate keeper and securely communicates requests from client devices to the CDS server. The CDS server is configured to manage and alert the ALEL of any enterprise policies that may be applicable to the client devices connected to the ALEL engine which, in turn, notifies the client devices to comply with the enterprise policies. The CDS server may synchronize any change made to the content by any of the client devices running network based applications.

20 Claims, 8 Drawing Sheets

Related U.S. Application Data continuation of application No. 15/134,817, filed on Apr. 21, 2016, now Pat. No. 9,578,013, which is a continuation of application No. 13/651,367, filed on Oct. 12, 2012, now Pat. No. 9,338,158.

(60) Provisional application No. 61/547,239, filed on Oct. 14, 2011.

(51) Int. Cl.
*G06F 15/16* (2006.01)
*G06Q 30/00* (2012.01)

(56) References Cited

U.S. PATENT DOCUMENTS

| | | | |
|---|---|---|---|
| 9,338,158 B2 | 5/2016 | Storm | |
| 9,578,013 B2 | 2/2017 | Storm | |
| 9,749,327 B2 | 8/2017 | Storm | |
| 2001/0028660 A1* | 10/2001 | Carolan | H04L 12/2801 370/466 |
| 2002/0038368 A1* | 3/2002 | Kojima | G06F 17/30905 709/225 |
| 2004/0001095 A1* | 1/2004 | Marques | G06F 3/002 715/771 |
| 2004/0068505 A1 | 4/2004 | Lee et al. | |
| 2004/0088349 A1* | 5/2004 | Beck | H04L 63/0407 709/203 |
| 2004/0139200 A1* | 7/2004 | Rossi | G06F 17/3087 709/228 |
| 2005/0010901 A1* | 1/2005 | Udler | G06F 9/4443 717/109 |
| 2005/0108650 A1 | 5/2005 | Muehlhausen | |
| 2006/0047693 A1* | 3/2006 | Kojima | G06F 17/30899 |
| 2006/0129937 A1* | 6/2006 | Shafron | G06F 9/4443 715/733 |
| 2007/0061486 A1* | 3/2007 | Trinh | G06F 17/30905 709/246 |
| 2007/0186212 A1* | 8/2007 | Mazzaferri | G06F 3/1415 718/1 |
| 2007/0245013 A1* | 10/2007 | Saraswathy | G06F 21/604 709/223 |
| 2007/0245238 A1* | 10/2007 | Fugitt | G06F 3/0481 715/700 |
| 2008/0010243 A1* | 1/2008 | Weissman | G06F 17/30424 |
| 2008/0201118 A1* | 8/2008 | Luo | G06F 17/2247 703/2 |
| 2009/0013173 A1* | 1/2009 | Savage | G06F 17/3056 713/150 |
| 2009/0031212 A1* | 1/2009 | Hsu | G06F 9/5055 715/234 |
| 2009/0063415 A1* | 3/2009 | Chatfield | G06F 9/542 |
| 2009/0150570 A1* | 6/2009 | Tao | H04L 67/06 709/249 |
| 2009/0157479 A1* | 6/2009 | Caldwell | G06F 17/30528 705/14.54 |
| 2009/0198828 A1* | 8/2009 | Sullivan | G06F 17/30719 709/231 |
| 2009/0285284 A1 | 11/2009 | Toma et al. | |
| 2009/0327916 A1* | 12/2009 | Baran | G06Q 30/02 715/745 |
| 2010/0057834 A1* | 3/2010 | Macken | G06F 9/543 709/203 |
| 2010/0077216 A1* | 3/2010 | Kramer | H04L 9/002 713/172 |
| 2010/0161973 A1* | 6/2010 | Chin | H04L 63/0807 713/159 |
| 2010/0174826 A1* | 7/2010 | Sharma | H04L 63/105 709/235 |
| 2010/0180192 A1* | 7/2010 | Hall | G06F 17/30905 715/234 |
| 2010/0185961 A1* | 7/2010 | Fisher | G06F 11/324 715/760 |
| 2010/0199170 A1* | 8/2010 | Hoffman | H04L 63/1416 715/234 |
| 2010/0246421 A1* | 9/2010 | Marshall | H04L 43/065 370/252 |
| 2011/0088011 A1* | 4/2011 | Ouali | G06F 8/10 717/105 |
| 2011/0093610 A1* | 4/2011 | Rezaiifar | H04L 67/02 709/232 |
| 2011/0161833 A1* | 6/2011 | Dheap | G08B 27/001 715/753 |
| 2011/0208631 A1* | 8/2011 | Glick | G06O 40/00 705/35 |
| 2011/0219057 A1* | 9/2011 | Scoda | H04L 65/105 709/203 |
| 2011/0285535 A1* | 11/2011 | Barwin | G08B 21/24 340/572.1 |
| 2011/0314042 A1* | 12/2011 | Nuggehalli | H04N 1/00244 707/769 |
| 2011/0319056 A1* | 12/2011 | Toy | H04L 9/3226 455/412.2 |
| 2012/0017112 A1* | 1/2012 | Broda | G06F 9/5083 714/4.4 |
| 2012/0023377 A1 | 1/2012 | Garskof | |
| 2012/0136698 A1* | 5/2012 | Kent | G06Q 20/3276 705/14.1 |
| 2012/0144202 A1* | 6/2012 | Counterman | G06F 21/335 713/176 |
| 2012/0151568 A1* | 6/2012 | Pieczul | H04L 63/0815 726/8 |
| 2012/0192055 A1* | 7/2012 | Antebi | G06F 17/30206 715/229 |
| 2012/0192064 A1* | 7/2012 | Antebi | G06F 17/2288 715/255 |
| 2012/0214443 A1* | 8/2012 | Daigle | H04L 9/3228 455/411 |
| 2012/0221696 A1* | 8/2012 | Ferris | H04L 67/327 709/223 |
| 2012/0239537 A1* | 9/2012 | Baker | G06Q 30/02 705/27.1 |
| 2012/0252405 A1* | 10/2012 | Lortz | G06F 8/60 455/410 |
| 2012/0254957 A1* | 10/2012 | Fork | G06F 21/33 726/6 |
| 2012/0290959 A1* | 11/2012 | Quine | G06F 8/34 715/765 |
| 2012/0291006 A1* | 11/2012 | Quine | G06F 8/00 717/105 |
| 2012/0331532 A1* | 12/2012 | Walters | H04L 12/66 726/5 |
| 2013/0067345 A1* | 3/2013 | Das | G06F 8/63 715/740 |
| 2013/0086204 A1* | 4/2013 | Ghosh | G06Q 10/00 709/217 |
| 2013/0097687 A1 | 4/2013 | Storm | |
| 2015/0095497 A1* | 4/2015 | Caputo | H04L 67/16 709/226 |
| 2016/0234189 A1 | 8/2016 | Storm | |
| 2017/0134387 A1 | 5/2017 | Storm | |

OTHER PUBLICATIONS

Peters, Bas, "On Almost Every Topic—jQuery DataTables, CMIS and Alfresco," personal blog powered by Tumblr, 2010-2013, last updated Mar. 27, 2011, 7 pages.

"Alfresco CMIS—Update on Alfresco's Draft CMIS Implementation," Alfresco Software, Inc., 2012, 6 pages.

International Preliminary Report on Patentability issued for PCT Application No. PCT/IB2012/002473, dated Apr. 24, 2014, 14 pages.

Office Action issued for U.S. Appl. No. 13/651,367, dated Mar. 25, 2014, 14 pages.

Office Action issued for U.S. Appl. No. 13/651,367, dated Sep. 22, 2014, 33 pages.

Office Action issued for U.S. Appl. No. 13/651,367, dated Mar. 23, 2015, 21 pages.

(56) References Cited

OTHER PUBLICATIONS

Office Action issued for U.S. Appl. No. 13/651,367, dated Aug. 20, 2015, 35 pages.
Office Action issued for U.S. Appl. No. 15/134,817, dated Jun. 15, 2016, 17 pages.

* cited by examiner

SYSTEM AND METHOD FOR SECURE CONTENT SHARING AND SYNCHRONIZATION

CROSS-REFERENCE TO RELATED APPLICATIONS

This application is a continuation of, and claims a benefit of priority under 35 U.S.C. § 120 of the filing date of U.S. patent application Ser. No. 15/413,601, filed Jan. 24, 2017, now U.S. Pat. No. 9,749,327, entitled "SYSTEM AND METHOD FOR SECURE CONTENT SHARING AND SYNCHRONIZATION, which is a continuation of, and claims a benefit of priority under 35 U.S.C. § 120 of the filing date of U.S. patent application Ser. No. 15/134,817, filed Apr. 21, 2016, now U.S. Pat. No. 9,578,013, entitled "SYSTEM AND METHOD FOR SECURE CONTENT SHARING AND SYNCHRONIZATION," which is a continuation of, and claims a benefit of priority under 35 U.S.C. § 120 of the filing date of U.S. patent application Ser. No. 13/651,367, filed Oct. 12, 2012, now U.S. Pat. No. 9,338,158, entitled "SYSTEM AND METHOD FOR SECURE CONTENT SHARING AND SYNCHRONIZATION," which is a conversion of, and claims a benefit of priority under 35 U.S.C. § 119(e) from Provisional Application No. 61/547,239, filed Oct. 14, 2011, entitled "SYSTEM AND METHOD FOR DEPLOYING APPLICATIONS WITH SEPARATION OF THE APPLICATION FROM KNOWLEDGE OF CONTENT DISTRIBUTION," all of which are fully incorporated by reference herein.

TECHNICAL FIELD

This disclosure relates generally to network enabled content distribution. More particularly, embodiments described herein relate to secure content sharing and synchronization with cloud capable software delivery and execution.

BACKGROUND

Enterprise Content Management (ECM) refers to the strategies, methods, and tools used to capture, manage, store, preserve, and deliver content and documents related to business processes. To this end, ECM generally covers the management of information within the entire scope of an enterprise whether that information is in the form of a paper document, an electronic file, a database print stream, or an e-mail. In one aspect, an ECM system can serve archiving needs as a universal repository. Users can access the centrally managed content through various distribution means. Possible examples include the Internet, extranets, intranets, e-business portals, employee portals, e-mails, faxes, mobile devices, multimedia services, and so on.

Enterprises are increasingly implementing ways to help present enterprise content to users in order to improve productivity, sales, and user engagement. Challenges arise in sharing and syncing enterprise content. For example, traditionally, enterprise software systems must be brought offline to do even a small upgrade to applications. Further, traditionally, clients all have access to the ECM repository and the clients and ECM are all integrally tied. Thus, if an update is made to the ECM, the user interface (UI) to the ECM system will also need to be updated. There is no way to alter one without altering the other one. To do an update, the ECM system must be down and when that is happening, no one has access to the document. On the other hand, cloud-based systems can roll-out incremental changes to cloud applications' user interfaces to all users and, as such, the cloud user interfaces can be constantly improved. This feature can be seen on free cloud services on the Internet. Applications like Google Docs, Twitter, and Facebook are constantly improving their user interfaces to streamline the usability of their features. While third party cloud services allow users to share their files, they do not provide for secure sharing and syncing of content owned by an enterprise in a manner that allows the enterprise to maintain control of their content. Embodiments disclosed herein can address the aforementioned challenges and more.

SUMMARY OF THE DISCLOSURE

Embodiments disclosed herein provide a system, method, and computer program product containing computer instructions for secure content sharing and synchronization which may be particularly useful for cloud capable software delivery and execution. The system may comprise a content engine, also referred to herein as a content sharing and synchronization engine or an application logic and execution layer (ALEL) engine, working in conjunction with a content distribution system (CDS) module. The ALEL engine may be configured to communicate with client applications executing on a plurality of client devices across multiple platforms. The ALEL engine may, in one embodiment, reside on an ALEL server. In one embodiment, the ALEL engine may reside on a client device.

In some embodiments, the ALEL engine may communicate with the plurality of client devices across multiple platforms via a standardized application programming interface (API). The API for the ALEL engine may contain a location of a particular content management system (CMS), content distribution system (CDS), enterprise content management system (ECM), or the like. Within this disclosure, these terms may be used interchangeably to refer to a system configured to manage enterprise content on one or more server machines in an enterprise computing environment. Also, within this disclosure, the term "enterprise content" may refer to any information that is owned, managed, or otherwise controlled by an entity. Such information may include structured data, unstructured data, semi-structured data, or a combination thereof, and may include files in various formats and data associated therewith. Structured data may conform to the formal structure of data models associated with relational databases or other forms of data tables used in an enterprise computing environment. Semi-structured data can be a form of structured data that does not conform to the formal structure of data models, but that contains tags or other markers to separate semantic elements and enforce hierarchies of records and fields within the data. An Extensible Markup Language (XML) document can be an example of semi-structured data. Unstructured data may not conform to the formal structure of the data models. Examples of unstructured data may include word processing documents, e-mail messages, pictures, audio and video files, etc.

In one embodiment, a plurality of client devices may communicate with the ALEL engine via the API in a standardized data interchange format such as Hypertext Transfer Protocol/JavaScript Object Notation (HTTP/JSON). Each of the plurality of client devices may execute an instance of a client application that comprises a user experience component (UXC) for a CDS, application logic that receives inputs from the UXC and that generates outputs displayed in the UXC, and knowledge of a location of and processes for interacting with the CDS. The knowledge of the location of and the processes for interacting with the CDS may be deployed from a dissociated CDS layer. The UXC may be deployed from a dissociated UXC layer. The application logic may be deployed from a dissociated ALEL layer. The client application may combine these components into a deployed application on a just-in-time basis.

The UXC, ALEL, and CDS layers may be logically and physically dissociated such that the CDS as well as the client applications executing on the plurality of client devices can be independently managed and updated without affecting each other. Since the clients and the CDS are dissociated, they do not directly communicate with each other. Rather, the clients and the CDS communicate with each other via the ALEL engine and the CDS module.

The CDS module, which may be part of the ALEL engine or the CDS, is configured to translate messages in the standardized data interchange format into a content server language that the CDS can understand. In response, the CDS provides requested content and ensures that any change made to the content by any of the plurality of client devices is synchronized at the back end.

In the same embodiment or a different embodiment, the ALEL engine can be the only public-facing component in an enterprise computing environment, acting as a proxy or gate keeper for the CDS. All other components in the enterprise computing environment are protected behind the firewall. As those skilled in the art will appreciate, this allows communications among the protected components to occur in a secure manner. Those skilled in the art will also appreciate that enterprise content may be governed by access permissions, automated classification, retention policies, and file storage policies. The CDS can alert the ALEL engine, via the CDS module and/or a notifier, to tell the client devices to comply with specific long-term retention and disposition policies without having to communicate directly with the client devices. This way, advantageously, the enterprise can retain control and management of their content.

The inventive systems, methods, and techniques described herein enable users, such as those in the enterprise, to experience functionality similar to file sharing cloud services with the added benefit of full desktop integration and easy access to synchronized content from mobile apps on user devices. While the user experience does not change, all the content is actually being stored behind the firewall with a full audit trail of all content access, modification, sharing, and synchronization activity, versioning history with a listing of all versions, complete with user notes for any modifications to each version or sub-version, retention policies with predefined rules about how long and where information is kept, discovery control to easily find information when necessary, and permission control on who in an organization can read, edit, share, or even see business content.

An example method of sharing content utilizing the secure content sharing and synchronization system may therefore comprise, in response to receiving a valid request for content from a client device, the ALEL engine opening a secure connection with the client device and transmitting the request for content through the firewall to the CDS module. The CDS module may translate the request for content and communicate same to the CDS. In response, the CDS may provide the requested content to the ALEL engine via the CDS module. The ALEL engine may then send the requested content to the client device over the secure connection.

Other embodiments are also possible. For example, one embodiment comprises a computer program product. The computer program product may comprise at least one non-transitory computer readable medium storing instructions translatable by at least one processor to implement an embodiment of a secure content sharing and synchronization system disclosed herein. Another embodiment of the computer program product may comprise at least one non-transitory computer readable medium storing instructions translatable by at least one processor to implement an embodiment of a secure content sharing and synchronization method disclosed herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
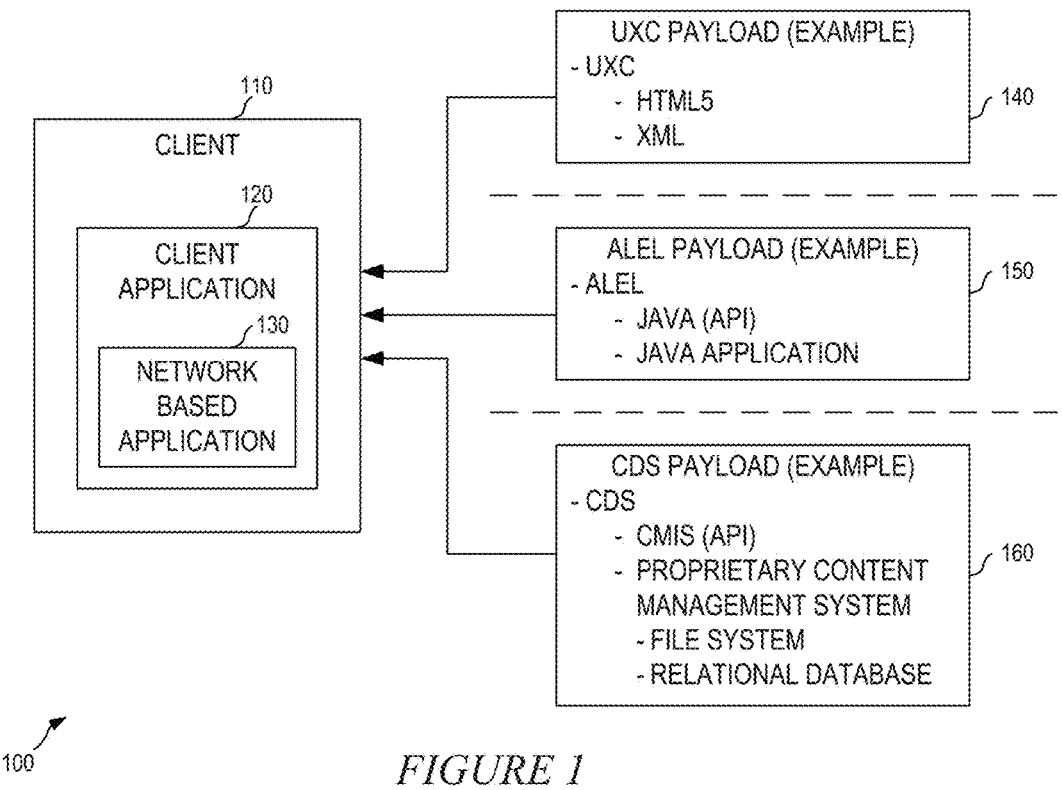
FIG. 1 depicts a diagrammatic representation of one embodiment of a system for providing an application with a separation between the application and a content distribution system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments described herein provide systems and methods for deploying network based applications and sharing enterprise content using these applications in a secure and centrally controlled manner.

A network based application runs on a client device at the front end and includes a user interface configured to allow a user on the client device to access and interact with functionality and/or data provided by one or more server machines at the back end. Such server machines often operate behind a firewall in an enterprise computing environment. As an example, a network based application can include the following components:

A user experience component (UXC hereinafter), such as a web user interface, a local application's graphical user interface, or a mobile application run on the operating system of a smartphone or other application capable client of variable factor.

An application logic and execution layer (ALEL hereinafter), typically contained within a compiled programmatic element on a server or Cloud infrastructure, or on the variable factor client itself. This layer executes the program affecting the UXC or accepting inputs from the UXC.

A content distribution system (CDS hereinafter), such as a file system, database, external storage device, storage area network, graphing database, relational database, Content Management System, Enterprise Resource Planning system or other CDS of variable factor. Within this disclosure, CDS can be representative of an enterprise content management (ECM) system.

A "cloud", for purposes of this application, is a scalable computer system or network that can be provisioned to create or mimic a desired hardware and software environment. Because many cloud environments can be provisioned to provide a scalable environment or an environment that can be created on demand, cloud computing is becoming increasingly popular for scalable applications or temporary events. It should be noted that embodiments described herein can be applied to various virtual machine environments.

In some application models, the ALEL, UXC and CDS could be controlled by a single entity that operates the server machines behind a firewall in an enterprise computing environment. In such an application model, the ALEL and UXC will have knowledge of the CDS before being delivered to a particular client. The network based application, as delivered to the client, will be aware of the location of and how to interact with the file system, database system or other CDS with which it will interact to access data. In this case, the UXC provided to the client as a webpage contains controls, which have executable logic. Some of this logic articulates the location of the CDS and the Application Programming Interface (API hereinafter) necessary to affect the CDS. The application logic, user experience elements and the network coordinates of the network based application's CDS all exist in proximity to each other via their transport mechanism and/or executable binary and configuration storage implementation methods.

An advantage of this type of application model is that the user interfaces can be constantly improved. This advantage can be seen on free cloud services on the Internet. Applications like Google Docs, Twitter, and Facebook, which are constantly improving cloud user interfaces to streamline the feature usability. Such incremental changes to the applications' user interfaces can be made because, by definition, there is only one instance of a cloud-based application that is used by all customers and users. This, and the fact they do not require the customer to assign any information technology (IT) staff to the maintenance of the application, make cloud-based applications very appealing.

However, there is a cost. The content storage and user interface components are inextricably linked and generally need to reside on the same machine or at the same network host name.

In a cloud-based system, the owner of the system (e.g., an enterprise) is required to give up control of the content. Once content is distributed or shared from an enterprise repository via a cloud-based application, the enterprise loses control of the content (or at least of a copy of the content which now resides "in the cloud"). This is in contrast with content distribution via an enterprise-based application where control remains within the confines of an enterprise computing environment. This contrast is illustrated in Table 1.

TABLE 1

|  | Enterprise-based Application | Cloud-based Application |
| --- | --- | --- |
| Control of user interface | Enterprise | Vendor |
| Control of content | Enterprise | Vendor |

Thus, the only way for an organization or business entity (collectively, enterprise) to realize the benefits of a cloud-based application (i.e. easy, ongoing user interface improvements with no downtime) is to give up the control of the content. This can be an unacceptable proposition for enterprises bound by enterprise requirements such as internal, vetted policies and/or legislation governing where and how the enterprise stores particular types of content.

As with storing data in the cloud, granting access to the data on a secured network is also unappealing. Risk is generated with respect to a given network's security when access is granted. To achieve access to a secured network, valid credentials and knowledge of the network location for a CDS or ALEL must be obtained. An application architecture which maintains a persistent state of geographical, logical or physical proximity with respect to the ALEL, UXC and CDS coordinates and affectation capabilities represents a threat to the secured network. Because of the undesirability of relinquishing control over data and providing access to its secured network, an entity may not be able to use cloud based applications.

Embodiments of the inventive systems, methods, and techniques described herein address the challenges in sharing and syncing enterprise content while maintaining control over enterprise content. In particular, embodiments described herein enable incremental upgrades including, but not limited to, cloud-based user interface upgrades. Further, embodiments described herein enable innovative and synergistic integration of cloud architecture for content distribution and enterprise-class infrastructure for content security, management, and control.

According to one embodiment described herein, network based applications are deployed to clients with knowledge of the CDS isolated, dissociated, or otherwise separated from the ALEL and UXC. The ALEL and UXC are delivered to the client without prior knowledge of the CDS. In some cases, the ALEL and UXC may also be delivered independently from and without knowledge of each other. In one embodiment, the ALEL, UXC and CDS information only comes together within an entity's secured network. Embodiments described herein provide the capacity to control the duration and method with which the UXC, ALEL and CDS exist in mutual geographical, logical or physical proximity.

FIG. 1 depicts a diagrammatic representation of one embodiment of a system for providing a network based application with a separation between the network based application and content distribution system. In the example of FIG. 1, system 100 may comprise client device 110 executing client application 120, such as a web browser or other client application. The client application is capable of providing a run-time environment for execution of variable application logic within an instance of the client application. According to one embodiment, such execution occurs in a just-in-time manner.

The client application can receive separately a UXC payload 140, an ALEL payload 150, and a CDS payload 160. In some embodiments, UXC payload 140, ALEL payload 150, and CDS payload 160 are dissociated from each other, as denoted in FIG. 1 by the separate boxes. These payloads are logically dissociated and can be provided from two or more physically dissociated server machines. This dissociation is further explained below with reference to FIG. 6. In the example of FIG. 1, UXC payload 140 includes information for providing a web interface or graphical user interface (UI). If UXC payload 140 is provided by a web server, UXC payload 140 can include, for example, HTML 5, XML or other markup language. ALEL payload 150 can include program code affecting the UXC or accepting inputs from the UXC. ALEL payload 150 can include for example, JavaScript, CSS or other application information. CDS payload 160 can include information on how to interact with a CDS including for example the location of the CDS and information necessary to interact with the CDS. The CDS interaction information may include, one or more of the type of API, resource request conventions (e.g., function calling conventions) including specifications for routines, data structures, object classes, protocols used to interact with the CDS, authentication information and the like. In one example, the CDS interaction information may specify request message formats (e.g., HTTP requests) and arguments and the structure of the response messages (e.g., an Extensible Markup Language (XML) structure, JavaScript Object Notation (JSON) data interchange format, etc.). In one embodiment, portions of the UXC payload in combination with one or both of the ALEL payload and CDS payload will make up the user experience in the UXC application.

In some cases, the ALEL may include the knowledge necessary to interact with various API's (or other interfaces), but not knowledge of the specific CDS with which the network based application, after being built by the client application, will interact. In such a case, the CDS interaction information may simply include the identity of the API (or other interface), the type of CDS or other information that along with the location of the CDS is sufficient for the network based application to interact with the CDS.

Information from the dissociated UXC payload, the ALEL payload, and the CDS payload can be combined to create an instance of the client application that includes i) a UXC, ii) application logic that receives inputs from the UXC, processes data and generates outputs displayed in the UXC, and iii) knowledge of the location of and processes for interacting with a specified CDS. For example, client application 120 may be a web browser. The information from dissociated UXC payload 140, ALEL payload 150 and CDS payload 160 can be combined into network based application 130 by web browser 120 as an instance of web browser 120 (e.g., a webpage) running on client device 110 (and thereby creating a deployed application using these dissociated payloads). In one embodiment, the combined knowledge of the UXC, ALEL and CDS may only exist on the client device while the deployed application is running on the client device. For example, as will be further described below, when the webpage implementing network based application 130 is closed, the UXC, ALEL and CDS may be flushed or otherwise deleted from a memory of client device 110.

UXC payload 140, ALEL payload 150, and CDS payload 160 can be provided to client device 110 in a variety of manners from two or more physical machines. Further, while shown as single logical blocks in FIG. 1, each of the UXC, ALEL and CDS payloads can be provided through a series of requests and responses.

Figure 2:
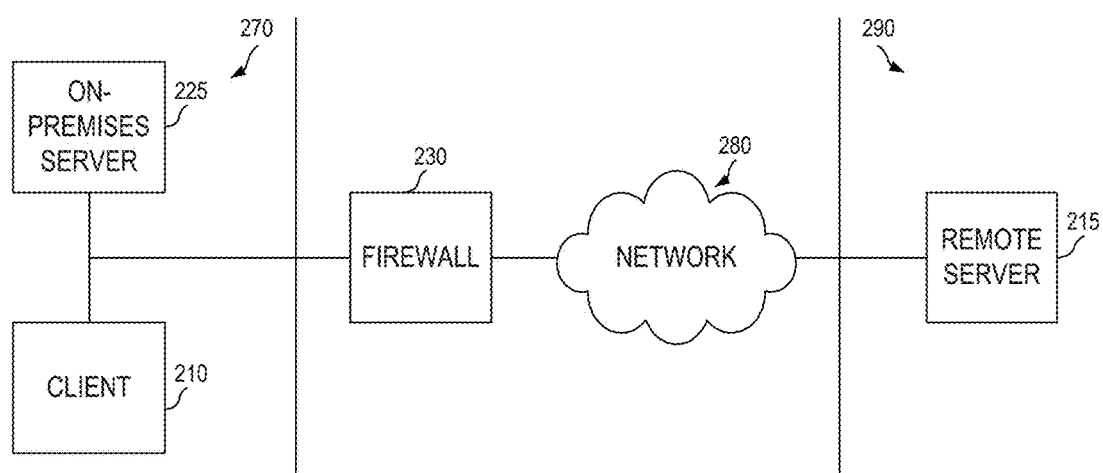
FIG. 2 depicts a diagrammatic representation of one embodiment of a computing environment comprising a client computer, an on-premises server, and a remote server.
Figure 3:
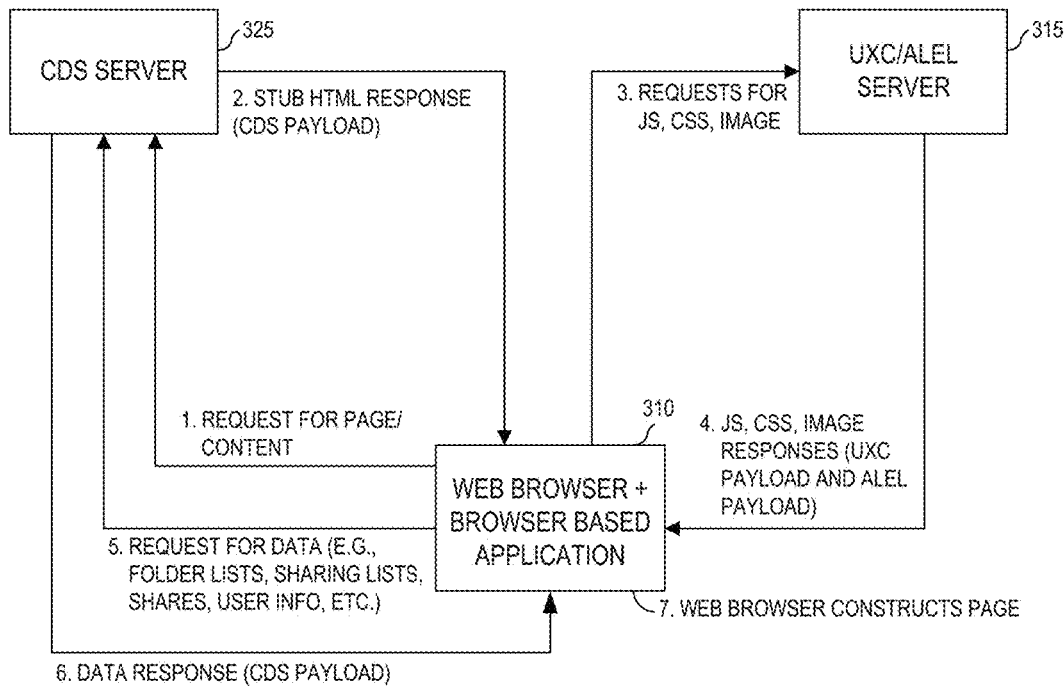
FIG. 3 depicts a diagrammatic representation of one embodiment of a flow exemplifying requests and responses in the computing environment of FIG. 2.

In operation, UXC payload 140, ALEL payload 150, and CDS payload 160 can be provided by separate entities. FIGS. 2 and 3 discussed below, for example, describe a system and data flow in which one entity controls its own CDS, while another entity provides the UXC and ALEL for a network based program. One advantage of deploying applications in this manner is that an entity can utilize network based applications without giving up control of data or allowing access to its secured network to the application provider.

FIG. 2 depicts a diagrammatic representation of computing environment 200 according to one embodiment of the inventive systems and methods described herein, including a client computer 210, an on-premises server 225, and a remote server 215. Client device 210 can be a variable factor client, including but not limited to a computer (e.g., desktop, laptop, server, tablet, etc.), cell phone, or other computing device. Client device 210 according to one embodiment can run a web browser or other client application.

The term "on-premises" means that on-premises server 225 can be controlled by the same entity as client device 210, can be in the same domain/host network as client device 210 (e.g., enterprise network 270) and can be behind the entity's firewall 230 with client device 210. According to one embodiment, on-premises server 225 can include one or more server machines with necessary control logic, in the form of software, hardware, or a combination thereof, configured to provide a file system, database, access to an external storage device, access to storage area network, graphing database, relational database, Content Management System (CMS), Enterprise Resource Planning system, Enterprise Content Management (ECM), or other types of CDS. In this disclosure, the term "CDS" is used to represent a variety of content sources, including a variety of content servers. One example of a content source would be a content management system, where the content managed includes documents, meta-data, etc. . . . relating to the business of the entity owning the content management system. According to one embodiment, on-premises server 225 can implement a content server, such as OpenText Content Server, manufactured by Open Text Corporation, Waterloo, Ontario, Canada.

Remote server 215 is separate and distinct from on-premises server 225 and is typically in a different domain/host network than on-premises server 225 (e.g., vendor network 290). Remote server 215 may be controlled by a different entity than on-premises server 225. Remote server 215 can include one or more web and/or application servers acting to provide a UXC and/or ALEL payloads. In one embodiment, remote server 215 includes a standard HTTP server that hosts JS, CSS, and image files or other resources that constitute a network based application. Remote server 215, for example, can be a cloud based server that provides a network based application over the Internet 280.

FIG. 3 depicts a diagrammatic representation of one embodiment of flow 300 exemplifying requests and responses in a computing environment, such as computing environment 200 described in conjunction with FIG. 2. In this example, the process begins with a user wishing to see, in his or her web browser 310 (which is a type of client application 120 as described above with reference to FIG. 1) running on a client device (e.g., client device 210), a screen that displays content stored on a content server (e.g., CDS server 325). The user starts by either clicking a link or typing a URL for the page into his/her browser. This may be the first time the web browser attempts to communicate with the content server. Following this user action, an example flow can be:

1. Request for a page from the on-premises system. The web browser running on the client device sends, on behalf of the user, a Hypertext Transfer Protocol (HTTP) request to a content server running on an on-premises server. As illustrated in FIG. 2, this first communication (an HTTP request from browser 310 to CDS server 525) may occur between client device 210 and on-premises server machine 225 in enterprise network 270, behind firewall 230. At this point, there is no communication occurring between client device 210 and remote server 215 outside of enterprise network 270.

2. Response from On-Premises Server. The on-premises server responds (via a CDS running thereon) with a small stub of HTML that contains the most basic structure of the page plus references to JS, CSS, and image resources that are hosted on a remote server. The references may be URLs or other references that provide the location of the hosted web application. The response may, in one embodiment, also include a CDS payload comprising an identifier of the location of the CDS and CDS interaction information (e.g., the identity of the API, the file system or other information so that the browser application knows how to interact with the CDS).

3. Requests for JS, CSS, and Images. Based on the references in the initial stub of HTML from the on-premises server, the web browser may make several requests to a remote server (e.g., remote server 215 implementing UXC/ALEL server 315) for JavaScript (JS), cascading style sheet (CSS), images, and other resources (without needing to provide the location of the CDS). The requests from the web browser to the remote server are considered dissociated from the request to the on-premises server in that information about the CDS (e.g., the location of the CDS, the CDS interaction information, etc.) is not communicated to the remote server.

4. Responses from the Remote Server. The remote server responds to the web browser with the requested JS, CSS, and image resources, in other words the UXC and ALEL payloads. The UXC and ALEL payloads are considered dissociated from the CDS payloads in that they contain no information about the CDS. These resources provided by the remote server make up a browser-based application. At this point, the browser-based application may be running in an instance of the web browser. The web browser may have already received the CDS payload from the on-premises server separate from the UXC and ALEL payloads from the remote server. In one embodiment, if the web browser has not received the CDS payload from the on-premises server at this point, the web browser may make a separate request for the CDS payload from the on-premises server. Using information from the CDS payload, the browser-based application can locate the information on the location of the CDS and the CDS interaction information so that the web browser knows where the CDS is located and how to interact with it.

5. Requests for Data. The web browser now has all the components of the browser-based application loaded, cached, and running. It can now make a subsequent request back to the on-premises server (or CDS) for specific data about the content the user wishes to see on the screen.

6. Data Response. The on-premises server responds to the web browser's requests for data in a format consumable by the browser-based application (e.g., JSON or other suitable data interchange format). According to one embodiment, the data is a raw data format and not HTML for rendering a web page. According to one embodiment, this data response can include specific content.

7. Page Construction. At this point, the web browser can completely render a page providing the user experience (UXC) of the browser base application deployed from the remote server and content stored on the on-premises server. Further user interactions with the browser-based application will either trigger the above process again, or will just make additional requests to the on-premises server (e.g., for new, additional, or updated content). The browser-based application can then re-render the user experience without subsequent requests to the remote server (the server providing the ALEL).

As an example use case, a user wishing to search for files in CDS server 525 makes a request for a page (step 1). CDS server 525 shown in FIG. 3 can be an implementation of on-premises server 225 shown in FIG. 2. UXC/ALEL server 315 shown in FIG. 3 can be an implementation of remote server 215 shown in FIG. 2. Web browser 310 shown in FIG. 3 may run on client device 210 shown in FIG. 2. Web browser 310 may have no information about CDS server 525 and the user request may require the user to be authenticated before web browser 310 can communicate with CDS server 525. Referring to FIG. 2, such an authentication may be implemented via firewall 230 or other authentication mechanism running on enterprise network 270. After the user has been authenticated, CDS server 525 can provide an HTML response (also referred to as a stub HTML response) that provides web browser 310 with information regarding the CDS, ALEL and/or UXC servers. The HTML response may include a small amount of information including opening and closing tags and a reference to where application logic for the browser-based application can be found (step 2). For example, the HTML response can include an URL for UXC/ALEL server 315 and/or a manifest of where JavaScript containing the application logic and code of the browser-based application can be found at UXC/ALEL server 315. The HTML response may, in one embodiment, also include a CDS payload which may include pointers to where the content resides (e.g., the location of specific pieces of content or the location of the file system, relational database or other system storing the content) and information necessary to interact with the CDS. For example, the HTML response may provide the URL for a network file server and identify the CDS as a NFS system. At this point, web browser 310, in some embodiments, may partially render a webpage on client device 210 based on the HTML response from CDS server 525.

In some embodiments, an HTML response from on-premises server 325 includes the following sample code segment:

```
<!DOCTYPE html PUBLIC "-//W3C//DTD XHTML 1.0 Transitional//EN"
"http://www.w3.org/TR/xhtml1/DTD/xhtml1-transitional.dtd">
<html>
    <head>
        <meta http-equiv="X-UA-Compatible" content="IE=edge" >
        <meta charset="UTF-8" />
        <meta name="viewport" content="width=device-width, minimum-scale=1.0, maximum-scale=1.0" />
        <title>Dispatch Web UI</title>
        <link type="text/css" rel="stylesheet" href="https://intranet-test.company.com/dispatch_webui/css/dispatch.css" />
        <link rel="shortcut icon" type="image/ico" href="https://intranet-test.company.com/dispatch_webui/img/favicon.ico">
        <script>
            info = {
                repo:      'https:\ /\ /intranet-test.company.com\ /dispatch_webui',
                cstoken:
                    '4Y+d839alYhjogRyjHiMVZ5EqrK1tE9kPoMtiyKIUINUmwgYUDdVcrJeeN7F0z3y
STNXTADIRDmLym72q0CKPw==',
                userID:           42769556,
                userName:         'user1',
                userPrefUILang:   'en-US',
                userRootFolderID: 58194567,
                userRootFolderName: 'Dispatch[1]',
                contentServerURL: 'https:\ /\ /intranet-test.company.com\ /intranet\
/livelink.exe',
                shortTimeFormat: '%I:%M %p',
                shortDateFormat: '%mV%dV%Y',
                longTimeFormat: '%I:%M %p',
                longDateFormat: '%mV%dV%Y',
                sessionExpiredMessage: 'User session has expired. Please re-authenticate.',
                userPrefDictionary: { }
            }
        </script>
        <script src="https://intranet-test.company.com/dispatch_webui/js/dispatch.js"></script>
    </head>
    <body>
    </body>
</html>
```

The following provides a brief explanation of portions of the example HTML response given above:

- `<link type="text/css" rel="stylesheet" href="https://intranet-test.company.com/dispatch_webui/css/dispatch.css" />"`
  - Instructs the web browser of the address of the CSS for the UXC/ALEL.
- `<link rel="shortcut icon" type="image/ico" href="https://intranet-test.company.com/dispatch_webui/img/favicon.ico">`
  `<script`
     `info = {`
  - Instructs the web browser of the address of the icon to use in the address bar in the web browser. This is a UXC/ALEL URL.
- repo: 'https:\/\/intranet-test.company.com\/dispatch_webui',
  - Provides the address of the UXC/ALEL server
- cstoken: '4Y+d839alYhjogRyjHiMVZ5EqrK1tE9kPoMtiyKIUINUmwg YUDdVcrJeeN7F0z3ySTNXTADIRDmLym72q0CKPw==',
  - Provides authentication token for web browser to make requests to the CDS
- userID:            42769556,
  userName:          'user1',
  userPrefUILang:    'en-US',
  userRootFolderID:  58194567,
  userRootFolderName: 'Dispatch[1]',

```
         contentServerURL: 'https:\ /\ /intranet-test.company.com\ /intranet\ /livelink.exe',
                -    Provides pieces of information for the web browser to make requests to
                     the CDS, including location.
    •    shortTimeFormat: '%I:%M %p',
         shortDateFormat: '%mV%dV%Y',
         longTimeFormat: '%I:%M %p',
         longDateFormat: '%mV%dV%Y',
         sessionExpiredMessage: 'User session has expired. Please re-authenticate.',
         userPrefDictionary: { }
         }
                -    Represents user and server settings on the CDS that can be used by the
                     UXC/ALEL for personalizing and localizing the user interface.
    •    script src="https://intranet-
         test.company.com/dispatch_webui/js/dispatch.js"></script>
                -    Provides the URL for the ALEL, in this example, the .js file that contains
                     the application logic and code of the browser-based application.
```

Web browser 310 will then send a dissociated request or requests to UXC/ALEL server 315 for the components of the browser-based application (step 3) without providing knowledge of the location of the content to UXC/ALEL server 315. These requests may include, for example, requests for JavaScript files and CSS pages. UXC/ALEL server 315 responds with the requested browser-based application components via the UXC and ALEL payloads (step 4). The UXC payload can include user experience data for the look and feel of the browser-based application. The ALEL payload can include instructions (e.g., JavaScript or other instructions) for locating the identifier for the location of CDS at the client and the CDS interaction information. Web browser 310 can combine information from the UXC payload, the ALEL payload, and the CDS payload and run the browser-based application—in this case, a search application executing in an instance of the browser. The search application after instantiation can locate the CDS information and determine the location of CDS server 525 and how to interact with the CDS server 525.

The search application can make a request for an initial set of information according to the logic of the search application (step 5) and CDS server 525 can return the requested data (step 6). For example, the initial data may include a folder listing so that the user can select under which folders in CDS server 525 to conduct a search. Web browser 310 can then construct a webpage having the UXC provided by the search application and display the content provided by CDS server 525.

As the user interacts with the webpage (e.g., by searching for documents in folders in the folder list), web browser 310 can make additional requests to CDS server 525 using the appropriate API and display the results via the webpage implementing the search application (i.e., the deployed browser-based application) without having to make subsequent requests to UXC/ALEL server 315.

In the above example, the search application does not need to interact with an application server for further processing. According to another embodiment, however, a deployed application may interact with remote server 215 to provide further processing. For example, a statistical analysis application may pass data to remote server 215 to allow remote server 215 to perform more resource intensive processing. The deployed application does not have to provide information to remote server 215 regarding the location of the content on which operations are being performed. Thus, while some discrete data may be passed for processing to remote server 215, remote server 215 does not have knowledge of the location of or how to interact with on-premises server 225.

In the previous example, the stub HTML response includes a CDS payload comprising an identification of the location of the CDS or other location of the content and CDS interaction information. In an alternative embodiment, the stub HTML response does not include the CDS interaction information. Instead, an on-premises server may return the CDS interaction information in response to a subsequent request from the browser (e.g., after the deployed program has been instantiated by the browser using information from the UXC/ALEL payloads). In yet another embodiment, the small HTML response does not include the identifier of the location of the content or CDS interaction information. Instead, the web browser can request the location of the content or CDS interaction information from the on-premises server after the browser-based application has been instantiated. In still another embodiment, the browser-based application may allow the user to specify the location of the CDS, enter a URL for an on-premises server or take another action that results in the browser making a request to a location. The on-premises server, in response to the request can return information regarding the location of the CDS and CDS interaction information. Those skilled in the art will appreciate that these are non-limiting examples and that other implementations may also be possible. For example, a network based application deployed on a client device via dissociated UXC, ALEL, and CDS payloads may operate to communicate with a CDS directly (examples of which are described with reference to FIGS. 3-6) or indirectly (examples of which are described with reference to FIGS. 7A-9).

According to one embodiment, the information from the UXC, ALEL and CDS payloads can be flushed or otherwise deleted from the client device at the occurrence of certain events. For example, the UXC, ALEL and CDS information can be deleted when the corresponding instance of the deployed application is terminated. According to another embodiment, the deployed application may remain persistent on the client device once deployed.

While remote server 215 is described above as providing a browser-based application, remote server 215 may provide other forms of application logic. In some embodiments, the application logic executes just-in-time in an application on a client device. The application logic may execute in applications other than web browsers as needed or desired.

In the foregoing examples, one entity (which may be referred to as the enterprise entity) can own and operate remote server 315 and need not have any knowledge of on-premises server 325 and the ALEL need not contain a reference to the CDS. Specifically, the UXC payload includes information for providing a web interface or graphical user interface (UI) and the ALEL payload can include program code such as JavaScript, CSS or other application information for affecting the UXC or accepting inputs from the UI. Thus, another entity (different than the enterprise entity) can provide the deployed application while the enterprise entity retains full control of enterprise content.

One advantage of embodiments described herein is that the user interface and application and execution logic can be updated and made available quickly to users (e.g., content consumers). As soon as updated UXC or ALEL is available, the next user making a request for the browser-based application from remote server 315 can receive the updated version of the browser-based application. For example, referring to FIG. 3, the ALEL only needs to be updated at UXC/ALEL server 315 and provided when requested. A persistent client application does not have to be reinstalled at each client device. Advantageously, this can be a significant savings in time and cost for the enterprise.

Figure 4:
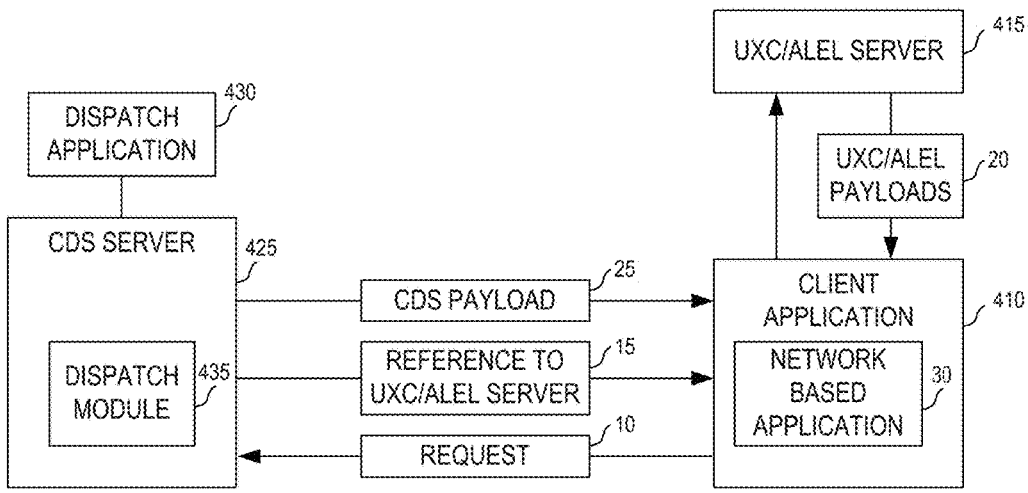
FIG. 4 illustrates logical blocks for one embodiment of an example software system for providing network based applications.

FIG. 4 illustrates logical blocks for one embodiment of system 400 for providing network based applications. In this example, client application 410 sends request 10 for a page to CDS server 425 (e.g., a content management system). CDS 425 can include dispatch module 435 that, in response to the request, interacts with dispatch application 430. Dispatch application may determine CDS payload 25 to return to client application 410 based, for example, on page request 10. In one embodiment, CDS payload 25 can include a reference to the location of CDS server 425 and information necessary to interact with CDS 425. In one embodiment, in response to page request 10, CDS server 425 returns CDS payload 25 and reference 15 which causes client application 410 to send a request to UXC/ALEL server 415 and receive, in response, UXC and ALEL payloads 20. Those skilled in the art will appreciate that this is a non-limiting example of a client-server transaction implementing the system architecture described above that enables dissociated UXC, ALEL, and CDS payloads. As illustrated above with reference to FIG. 3, in another embodiment, in a response to a request from a client application, the CDS server may return a stub HTML response that includes a small amount of information including opening and closing tags and a reference to where application logic and code for a requested browser-based application may be found at the UXC/ALEL server. Client application 410 can execute instructions in the ALEL payload to provide network based application 30 that, through the information in CDS payload 25, knows where the CDS is located and, in one embodiment, how to interact with the CDS. In one embodiment, CDS payload 25 does not contain any specific piece of content.

It should be noted that the logical blocks of FIG. 4 are provided by way of illustration and the processing associated with each logical block of FIG. 4 can be performed on a single computer or be distributed across multiple computers. Furthermore, the processing can be implemented as a single program or module or be implemented as multiple programs or modules or according to any suitable software architecture, another example of which is illustrated in FIG. 5.

Figure 5:
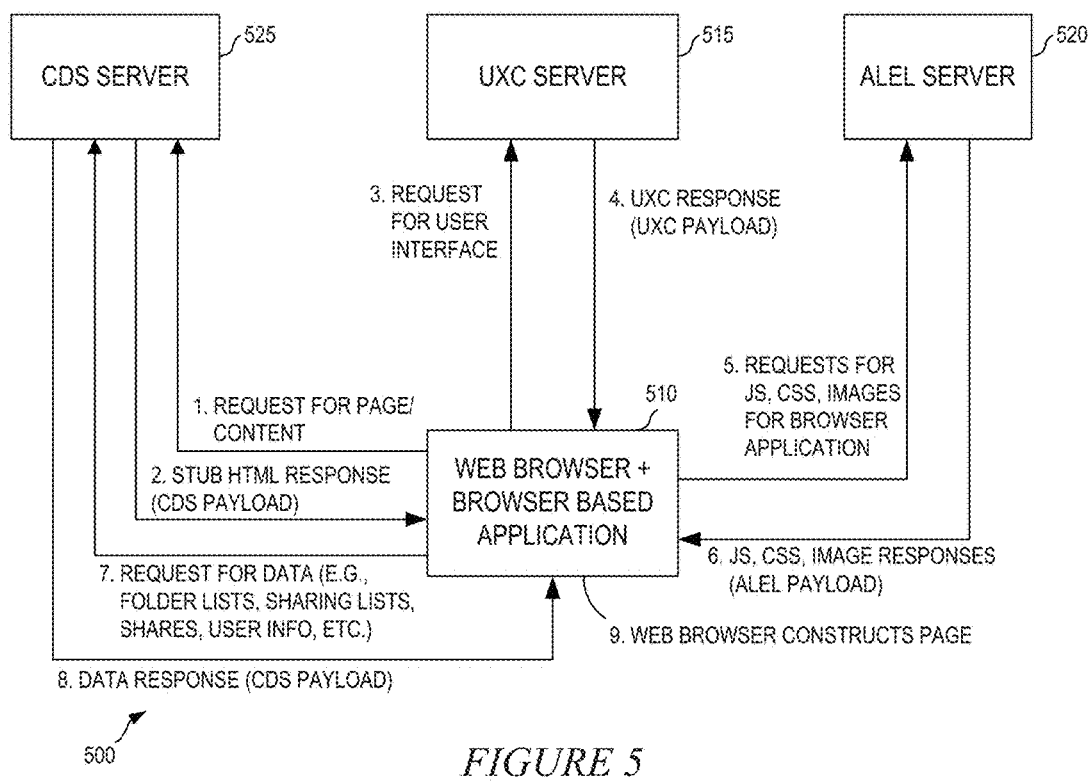
FIG. 5 depicts a diagrammatic representation of one embodiment of a flow exemplifying requests and responses among dissociated UXC, ALEL, and CDS layers.

FIG. 5 depicts a diagrammatic representation of one embodiment of flow 500 exemplifying requests and responses in a computing environment in which there is further separation between the UXC, ALEL and CDS. In this embodiment, an on-premises server (e.g., CDS server 525) can provide the CDS component for a network based application, a first remote server (e.g., UXC server 515) can provide the UXC, while a second remote server (e.g., ALEL server 520) can provide the ALEL component. These remote servers may be at different domains and be controlled by different entities. For example, UXC server 515 and ALEL server 520 can be external to the network environment where the client device resides and/or where CDS server 525 resides. An example flow can be:

1. Request for CDS page. A web browser sends an HTTP request to an on-premises server.
2. Response from CDS. The on-premises server responds with a small stub of HTML that contains the most basic structure of the page plus references to a first remote server. The reference may be URLs or other references that provide the location of the UXC for the hosted web service. The response may also include, via a CDS payload, pointers to where the content resides and CDS interaction information.
3. Request for UXC. Based on the references in the initial stub of HTML from the on-premises server, the web browser may make several requests to the first remote server for UXC data.
4. Response with UXC Payload. The first remote server responds with UXC data, such as HTML5, XML or other data via a UXC payload. According to one embodiment, if the short HTML response from the on-premises server did not include a reference to a second remote server, the first remote server can respond with a reference to a location of the browser-based application components.
5. Requests for JS, CSS, and Images. Based on the references in the initial stub of HTML from the on-premises server or from the payload provided by the first remote server, the web browser may make several requests to the second remote server for JavaScript (JS), cascading stylesheet (CSS), image resources, or other resources.
6. Responses from the ALEL Server. The second remote server responds to the web browser with JS, CSS, image resources or other resources via ALEL payloads. These resources make up the browser-based application. At this point, the browser-based application is running in an instance of the web browser (web browser 510 in the example of FIG. 5).
7. Requests for Data. The web browser now has all the components of the browser-based application loaded, cached, and running. It can now make a subsequent request back to the on-premises server for specific data about the content the user wishes to see on the screen.
8. Data Response. The on-premises server responds to the web browser's requests for data in a format easily consumable by the browser-based application (e.g., JSON or other format).
9. Page Construction. At this point, the web browser has enough information to build the user experience of the page for the user. Specifically, the web browser has the specific content that the user wishes to see on the screen from the on-premises server and the web browser also has the browser-based application (with the user experience component and the application logic and execution layer information) from the remote servers (UXC server 515 and ALEL server 520 in the example of FIG. 5).

As discussed above, the web browser can now fully render the web page and the deployed program (running as an instance of the web browser on the client device) can interact with the CDS at the back end on the server side. An example of this interaction will now be described.

Figure 6:
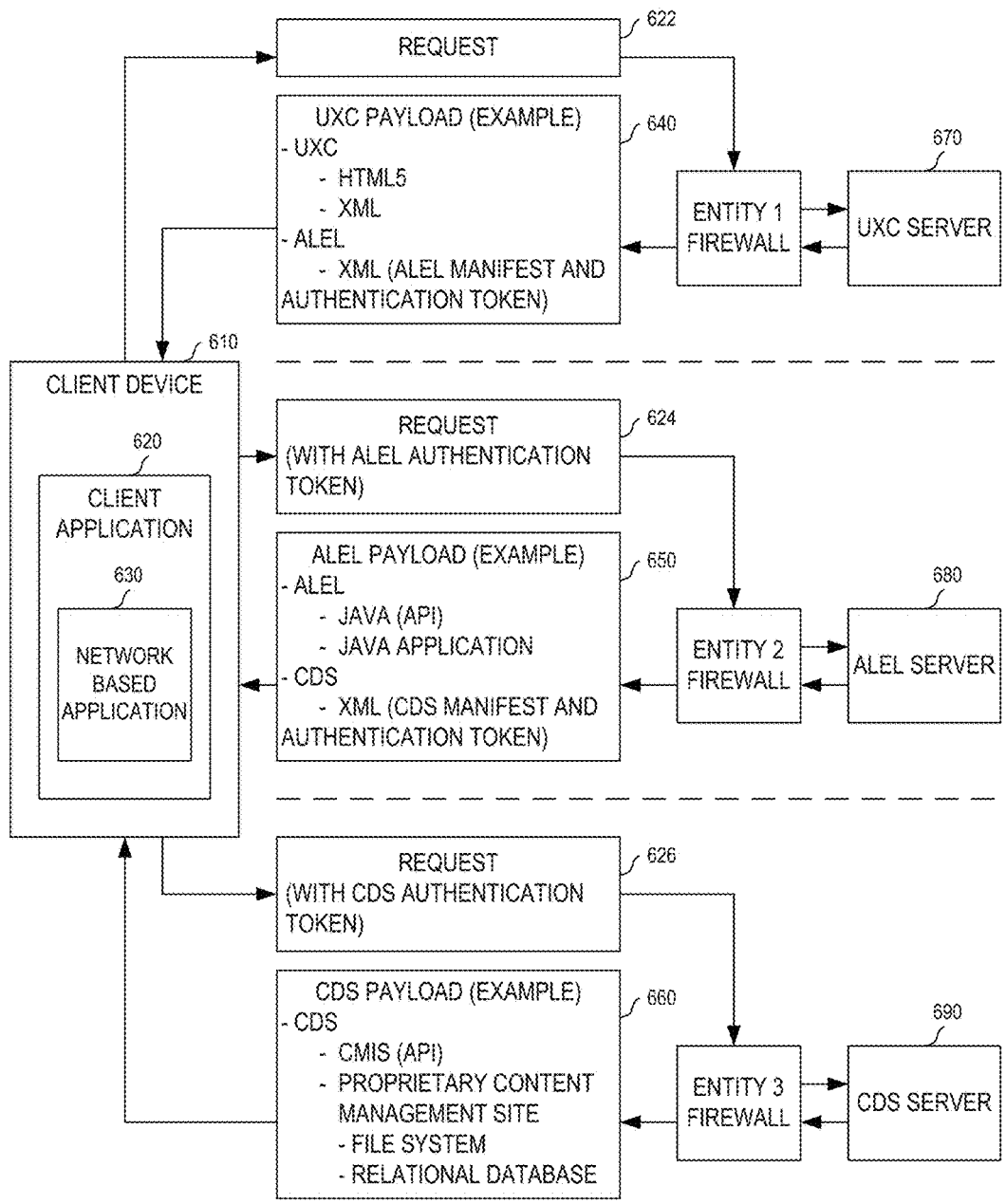
FIG. 6 depicts a diagrammatic representation of one embodiment of an example system architecture where servers implementing dissociated UXC, ALEL, and CDS layers can be controlled by different entities, be at different domains and be behind different firewalls.

FIG. 6 depicts a diagrammatic representation of one embodiment of system 600 comprising at least a client device, a UXC server, an ALEL server, and a content server. The servers implementing dissociated UXC, ALEL, and CDS layers can be controlled by different entities, be at different domains and behind different firewalls.

In this example, client device 610 can include a client application, such as a web browser or other client application capable of providing a run-time environment for execution of variable application logic within an instance of the client application. According to one embodiment execution occurs in a just-in-time manner.

According to one embodiment, the client application 620 may request a UXC from UXC server 670 by sending request 622 (e.g., in the form of a request for access at a particular URL) to UXC server 670. One example of UXC server 670 may be a web server hosting an e-commerce site. For example, client application 620 may request a page from the e-commerce site hosted on UXC server 670. In response, UXC server 670 may return UXC payload 640 that includes UXC information (such as HTML and/or XML) and an ALEL manifest. In one embodiment, the ALEL manifest can provide the location of ALEL server 680 (e.g., as URL or other identification of location). In one embodiment, UXC payload 640 may also include authorization information, such as an authentication token that can allow client application 620 to send requests to ALEL server 680. In one embodiment, the authentication token that is part of UXC payload 640 may be created using user credential submitted via client application 620 to UXC server 670 and may identify the user and/or a particular session with client application 620. Using information from request 622, UXC server 670 can create an authentication token to be used by client application 620. Such an authentication token may be two-way encrypted and inserted into a server response. Those skilled in the art will appreciate that this authentication process may be implemented in various ways.

Using the ALEL manifest in UXC payload 640, client application 620 can then send request 624 to request application and execution logic from ALEL server 680. In response, ALEL server 680 can provide ALEL payload 650 containing the ALEL (e.g., a JAVA API and or JAVA application) and a CDS manifest. The CDS manifest can contain a reference to the location of content. In one embodiment, ALEL payload 650 may also include authorization information, such as an authentication token for client application 620 to send requests to CDS server 690. Using information from request 624, ALEL server 680 can create an authentication token to be used to access content at CDS server 690. The authentication token may be created using user credential submitted via client application 620 and may identify the user and/or a particular session. Implementations of authentication processes are known to those skilled in the art and thus are not further described herein. At this point, while client application 620 may know the location of CDS server 690, client application 620 may not have all of the information necessary to interact with CDS server 690.

Client application 620 can then send request 626 to CDS server 690 (which can include the authentication token to allow interaction with CDS server 690). In turn, CDS server 690 can return CDS payload 660 to client application 620. In this embodiment, CDS payload 660 includes information necessary to interact with CDS server 690. In one embodiment, CDS payload 660 does not contain specific content data. In one embodiment, subsequent interactions between the client application 620 and CDS server 690 can deliver the CDS content shown in CDS payload 660 (e.g., CMIS API, Proprietary Content, content from file systems/relational databases, etc.). In an alternative embodiment, the CDS payload with content can be returned in response to the initial request from the client application containing the CDS authentication token. In one embodiment, UXC payload 640, ALEL payload 650, and CDS payload 660 can be combined by client application 620 to form a single logical network based application 630 capable of interacting with CDS server 690 and providing a user experience environment to the user through client device 610. In one embodiment, portions of UXC payload 640 in combination with one or both of ALEL payload 650 and CDS payload 660 make up the user experience in the deployed application (e.g., network based application 630) within the client application 620.

In system 600, UXC server 670, ALEL server 680, and CDS server 690 are all logically and physically separated devices (however, in alternative embodiment, any two of these servers could be combined at a single physical and/or logical device). While the UXC server knows the location of the ALEL server and the ALEL server knows the location of the CDS, control of the various servers can be distributed between different entities. Thus, for example, an e-commerce site acting as UXC server 670 can provide a branded user interface for an application hosted by a second entity that operates on the content administered by another entity (e.g., a cloud storage provider) without the e-commerce provider or deployed application provider knowing how to access the data at CDS server 690. This dissociation allows the UXC server, ALEL server and CDS to be controlled, managed, and updated independent of each other. For example, CDS server 690 can update, control, and manage its content without affecting the e-commerce site hosted on UXC server 670 and/or ALEL server 680. Likewise, UXC server 670 can update its user experience environment (e.g., deployed app 630) for the e-commerce site presented through client application 620 without affecting ALEL server 680 and/or CDS server 690. Thus, in one embodiment, when UXC server 670 is updated to update the user experience, if this update does not affect the CDS server 690 (e.g., a change to the UXC server 670 code will have no effect on the CDS server 690 code), then CDS server 690 does not need to be "brought down" while UXC server 670 is brought down to be upgraded. Furthermore, in some corporate environments, due to internal rules/policies, even when an upgrade to UXC server 670 does not affect the operation of CDS server 690, both UXC server 670 and CDS server 690 will be brought down and re-tested before taking the system live again (this can be particularly prevalent in prior art systems where the payloads of the UXC, ALEL and CDS are not disassociated). This is because it is easier for policy reasons to implement a rigid policy, rather than trying to determine on a case-by-case basis if the change to UXC server 670 will actually affect CDS server 690. However, in this embodiment, because of the disassociation of the payloads and the requests for those payloads from the client application 620, the owner of the back end system can be more comfortable that upgrades to UXC server 670 will not require "taking down" CDS server 690.

Figure 7A:
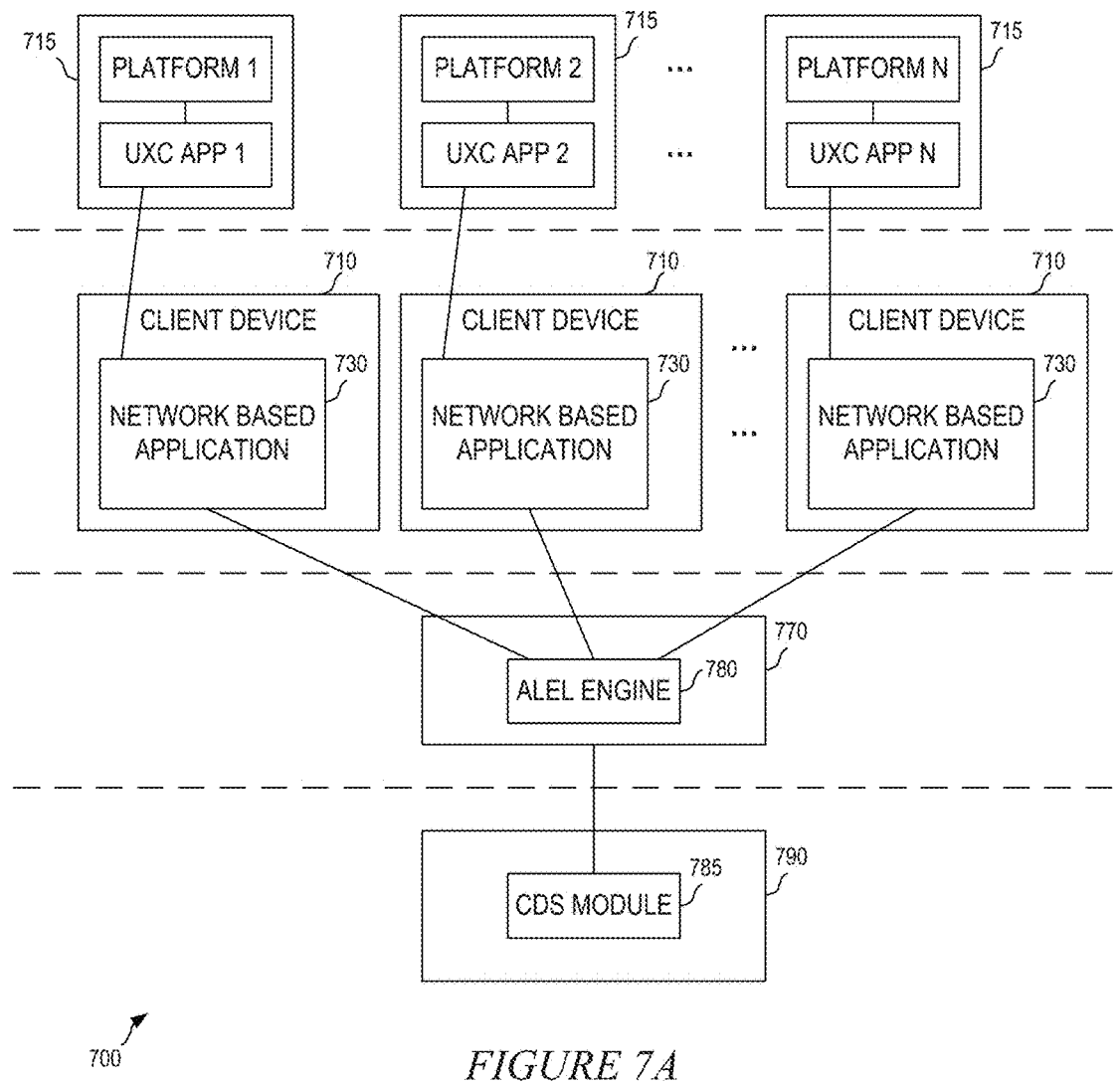
FIGS. 7A and 7B depict diagrammatic representations of example implementations of the system architecture of FIG. 6 with dissociated UXC, ALEL, and CDS and components thereof.
Figure 7B:
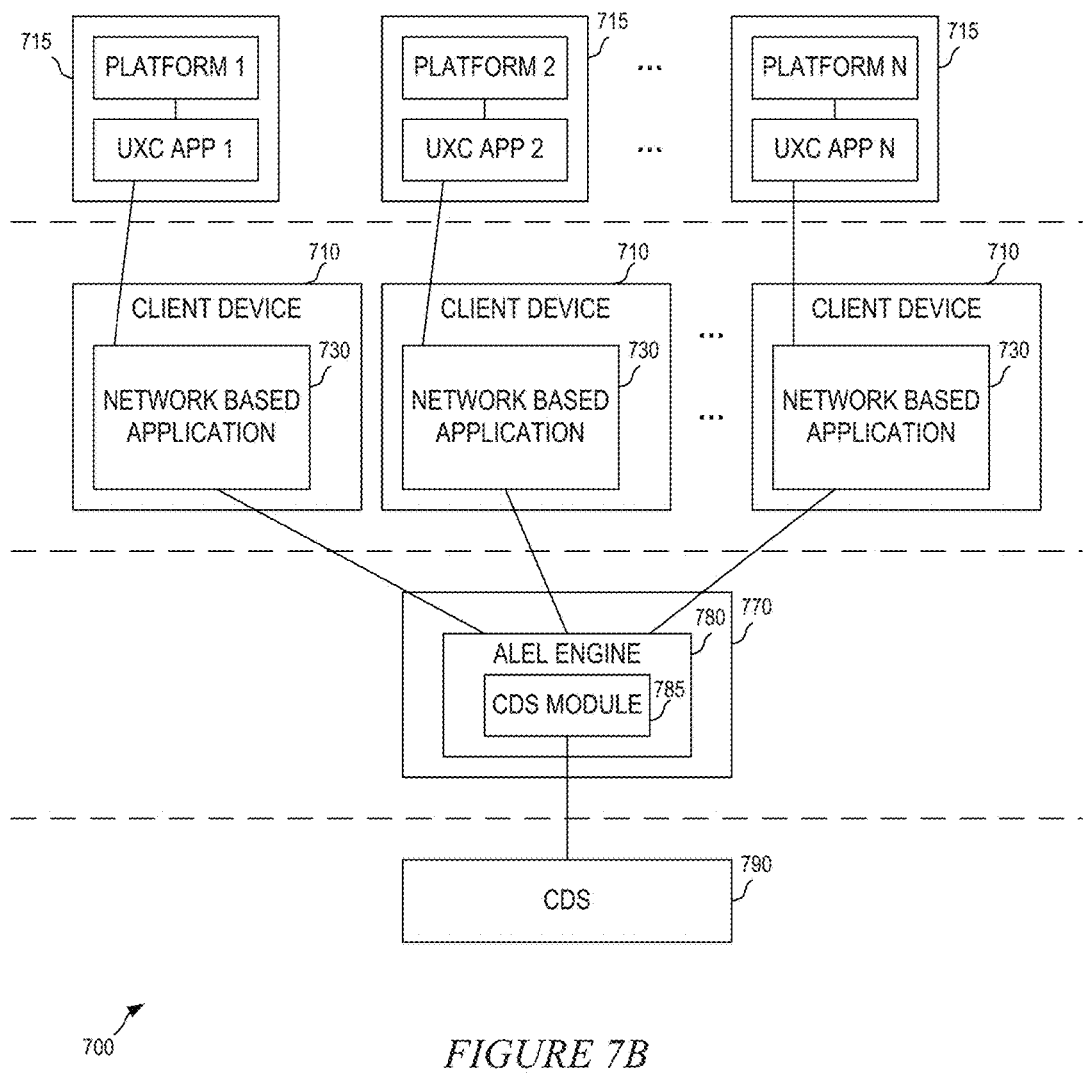

System 600 of FIG. 6 illustrates by example one embodiment of a dissociated computing environment in which the UXC, ALEL, and CDS layers can be physically and logically dissociated. Those skilled in the art will appreciate that many implementations are also possible. FIGS. 7A and 7B depict diagrammatic representations of example implementations of a dissociated computing environment with dissociated UXC, ALEL, and CDS layers and components thereof. In the examples of FIGS. 7A and 7B, a network based application running on a client device may directly and/or indirectly communicate with a CDS server at the back end.

Like system 600 shown in FIG. 6, system 700 shown in FIGS. 7A and 7B comprises a plurality of UXC servers 715 independently owned and operated by a plurality of entities. The plurality of servers may run on a variety of platforms and communicate with client devices 710 running on such platforms to provide user experience environments via network based applications 730 running on the client devices. As described above, such a user experience environment may be deployed as a web user interface (UI), a local application's graphical user interface, a mobile application run on the operating system of a smartphone, or the like. For the sake of illustration, such a deployed application may be referred to herein as a UXC app. As illustrated in FIGS. 7A and 7B, UXC apps may be hosted on UXC servers 715 operating on various platforms. For example, Platform 1 referred to in FIG. 7A may be a mobile operating system such as iOS which is developed and distributed by Apple Inc. UXC app 1 in FIG. 7A may be built at server 715 and deployed to client devices running iOS. Different UXC apps can be built by different entities and deployed to different client devices running different platforms. As described above, the physical and logical dissociation of the UXC, ALEL, and/or CDS allow the UXC apps to be independently developed, deployed and updated without affecting the ALEL and CDS servers. Each UXC app may contain a UXC for a particular application hosted on the ALEL server and instructions to get the application from the ALEL server. Examples of UXC apps may include, but are not limited to, a search application for searching a CDS, a browsing application for exploring the CDS, etc.

System 700 may further comprise ALEL server 770 and CDS server 790 (or CDS 790). ALEL server 770 may comprise ALEL engine 780. ALEL server 770 and CDS 790 may be owned by the same entity or they may be owned by different entities. As illustrated in FIG. 7A, one embodiment of CDS 790 may comprise CDS module 785 configured to communicate with ALEL engine 780 on ALEL server 770. As illustrated in FIG. 7B, one embodiment of ALEL engine 780 may incorporate CDS module 785 and be configured to communicate with CDS 790. In one embodiment, the CDS module may be referred to as a content server module.

CDS 790 may operate as a central repository for content owned and managed by an entity. In system 700, the UXC (e.g., the look and feel of user experience using an embodiment of system 700), the ALEL (e.g., the functionality of system 700), and the CDS (e.g., the content stored on and shared via system 700) are dissociated from one another. This allows the UXC, ALEL, and CDS to be implemented in or hosted on different, physically dissociated machines. Thus, client devices can now operate in the cloud or other dissociated computing environments, while the entity can upgrade, manage, or otherwise control CDS 790 without having to shut down or otherwise affecting any of the applications deployed on the client devices and/or the ALEL server. Likewise, the UXC (which provides the look and feel of system 700), the ALEL (which provides the functionality of system 700), or both can be updated or otherwise controlled without affecting the CDS (which provides the content of system 700). As will be further described below with reference to FIG. 8, this dissociated computing environment further allows content from the central repository to be shared remotely and securely as well as synchronized in a timely and efficient manner. Since the entity retains control of content of CDS 790, business processes such as document retention policies can also be readily implemented in a timely and efficient manner.

Figure 8:
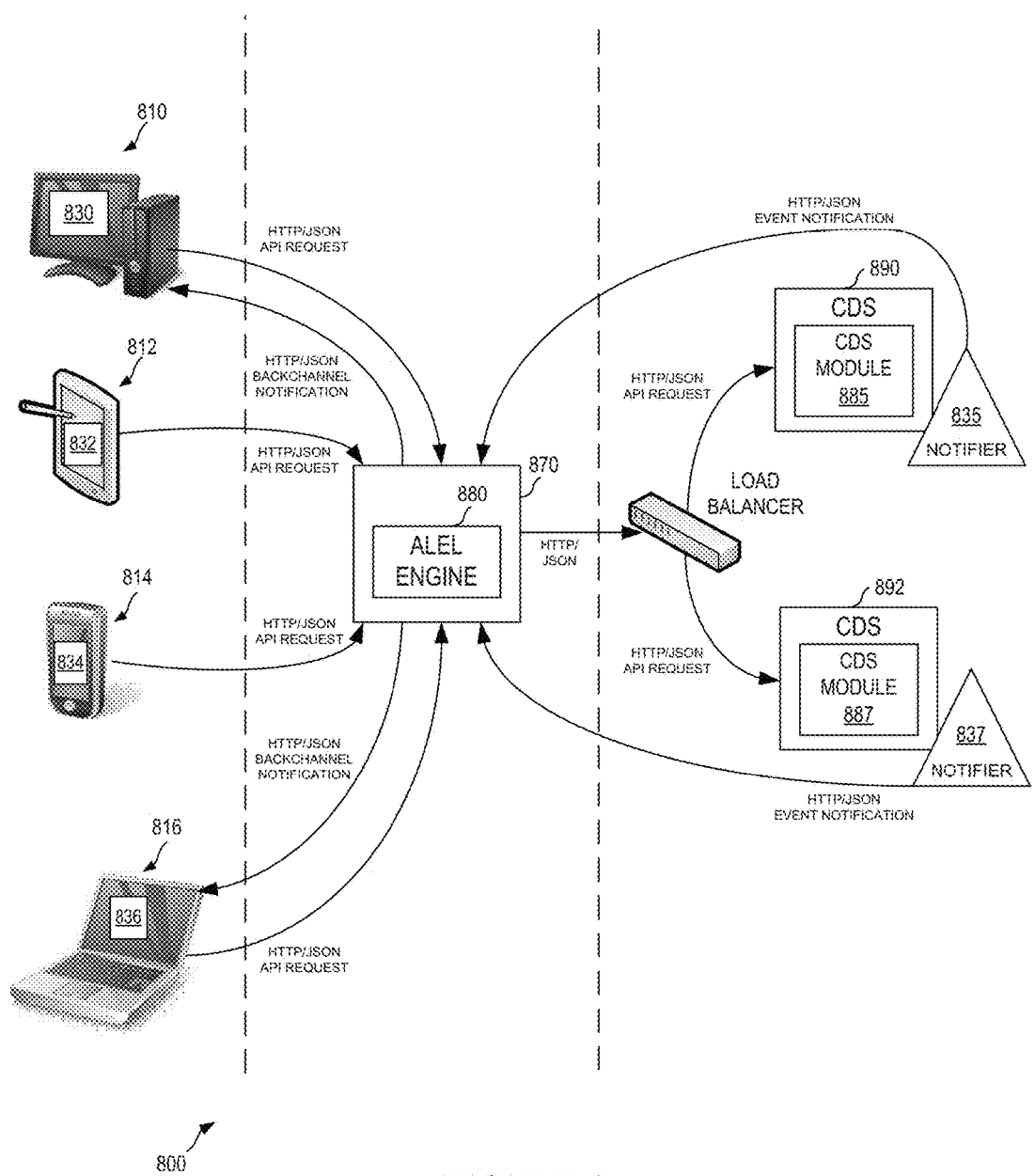
FIG. 8 depicts a diagrammatic representation of one embodiment of a secure content sharing and synchronization system with dissociated UXC, ALEL, and CDS and components thereof.

FIG. 8 depicts a diagrammatic representation of one embodiment of a content sharing system (e.g., system 800). System 800 may include various types of client devices (e.g., client devices 810, 812, 814, and 816) running on different platforms as described above with reference to FIGS. 7A and 7B. Each client device may have an appropriate UXC app (e.g., network based applications 830, 832, 834, and 836) built to communicate with ALEL engine 880 running on ALEL server 870. After a network based application is deployed to, loaded, and running on a client device as described above, it can send requests, directly or indirectly, through ALEL server 870, back to an on-premises server, a content server, or in the example of FIG. 8, CDS 890 and/or CDS 892, for specific content for use on the client device. A network based application may interact with a CDS indirectly through an ALEL engine executing on an ALEL server (as shown in FIGS. 7A-8) or directly with a CDS (as shown in FIGS. 3-6). In one embodiment, a network based application (e.g., network based application 832) may comprise an API used to interact with ALEL engine 880. As described above, this API may be provided from a UXC/ALEL server such as UXC/ALEL server 315 shown in FIG. 3 or separately from an ALEL server such as ALEL server 520 as shown in FIG. 5.

In one embodiment, ALEL engine 880 can be implemented as a public-facing Tomcat Web Application, outside of the firewall of an enterprise computing environment that includes, for example, CDS 890 and CDS 892 shown in FIG. 8. CDS 890 may run on one or more server machines (collectively referred to as CDS 890). Likewise, CDS 892 may run on one or more server machines (collectively referred to as CDS 892). Such a CDS may be configured to store, control and manage content that is owned by an enterprise. In this disclose, the term "enterprise" is representative of any entity such as a business, organization, company, government agency, etc. One or more employees of the enterprise may use various client devices, each having one or more appropriate UXC apps, to access and interact with content contained in the CDS. Depending upon implementation, each client device may or may not have a local cache managed by the CDS (via ALEL engine 880 and CDS module 885 in the example of FIG. 8) at the back end. Such a cache may be specific to a CDS and encoded such that only ALEL engine 880 may access on behalf of the CDS.

As an example, a user wishing to access a document stored in CDS 890 may type in an URL and passcode via his/her UXC app running as an instance of a client application on client device 810. ALEL server 870 receives the user request and allows the user to access the document at CDS 890 behind the user's company's firewall and also allows the user to make any change to the document. ALEL engine 880 can operate to sync the change (a local version of the document may be cached on client device 810) with the document on CDS 890 at the back end.

CDS module 885 can serve as an abstraction layer between ALEL engine 880 and CDS 890. In one embodiment, CDS module 885 comprises logic or code for setting up CDS 890 and controls some of the system functionality of CDS 890. A CDS module can communicate with a content server in a language that is understood by the content server. It can translate a request from the ALEL engine into something the content server can understand. For example, ALEL engine 880 may receive an HTTP/JSON API request from client device 810 to add a document to CDS 890. HTTP/JSON messages may be standardized and may take the form: {type":"request","subtype":<API Name>,"cstoken":<LLCookie>,"info":{API Param key value pairs>}}. Other forms may also be possible.

ALEL engine 880 may check to see if the HTTP/JSON API request is valid (in a valid format from a valid source), opens up a secure connection, and transmits it to CDS module 885. CDS module 885 may map and/or translate the request to however number of repository actions in the appropriate content server language so that CDS 890 can understand what to do where and what that means.

CDS module 885 may get response(s) (e.g., "the document has been successfully added to the repository," etc.) from CDS 890 and translate them back to the JSON language that the requesting client (client device 810 in this example) can understand.

Although not shown in FIG. 8, a CDS module can be a share point and interface with multiple CDS systems. As shown in FIGS. 7A and 7B, a CDS module can be part of the ALEL engine or the content server. As described above, the ALEL engine and the content server can be owned by the same entity or different entities.

In one embodiment, CDS module 885 can be a Java application that runs in a Java Runtime Environment known as the Java Virtual Machine (JVM). Likewise, notifier 835 can run in JVM as a messenger for CDS 890. Similarly, notifier 837 can act as a messenger for CDS 892. In one embodiment, notifier 835 can be part of CDS 890.

In the example of FIG. 8, notifier 835 can communicate with ALEL engine 880. In one embodiment, ALEL engine 880 may have the necessary intelligence to translate a content server notification (as communicated by notifier 835) into an appropriate HTTP/JSON Backchannel Notification. In this way, in response to a change to a document at the back end, ALEL engine 880 may communicate the change to one or more client devices from where the document has been or is accessed. Again, from the client perspective, the API to communicate with ALEL engine 880 can include an industry standard HTTP/JSON message with the right "hook" (e.g., an URL to ALEL engine 880). Applications running on client devices do not need to know the connection between ALEL engine 880 and CDS 890. This API (which, as described above, can be part of a network based application that is built to run on a client device) controls how the client device talks to the ALEL engine to access the files on the content server. One example of the API may implement a sharable folder linking a user on a client device to a server folder. Implementation of such an API is within the knowledge of those skilled in the art and thus is not further described herein.

In one embodiment, the client device may have its own notifier configured to communicate with the ALEL engine. However, the notifier on the client device does not know how to communicate with the content server behind the ALEL engine. In this case, the ALEL engine may have the necessary intelligence to translate a client operating system (OS) notification into a HTTP/JSON message and communicate same to the CDS module. The client notification does not contain server instructions. The CDS module may then translate the HTTP/JSON message into a content server message that can be understood by the content server.

In embodiments where the ALEL and CDS servers are owned by the same entity, they can be under the control of the entity's administrators behind their firewall. The entity may have no (and does not have to have) control of applications running on the client machines. For example, a user on a client device is using a word processing application to display and edit a document from CDS 890. When the entity needs to update CDS 890, there is no need to reinstall the word processing application, just change the word processing application's API to CDS 890.

Behind the scene, ALEL engine 880 manages, in conjunction with CDS modules 885, 887, interactions between client devices 810, 812, 814, and 816 and CDS servers 890, 892. As described above, because UXC, ALEL, and CDS payloads can be separately deployed to client devices, client devices 810, 812, 814, and 816 do not need to know how to communicate with CDS servers 890, 892, and vice versa.

To this end, a CDS module can act as a translator for a content server and communicate with an ALEL engine to implement business processes applied to the content server. For example, suppose the entity has a record retention policy to delete a certain file with a 5-year lifespan. The CDS module can interpret a content server message that this file needs to be deleted from any client device that has it and sends a corresponding HTTP/JSON message to the ALEL engine. The ALEL engine, in turn, communicates in HTTP/JSON with client device(s) to effect the deletion of the file from the client device(s). Since a client device must have the appropriate JSON/API (which includes an URL of the ALEL engine) to communicate with the ALEL engine, the ALEL engine can be considered as a proxy or gate keeper for the content server. That is, if a client is not using the JSON/API, it cannot get through the ALEL engine and therefore cannot get through to the content server. Note that there can be multiple versions of the API available for a UXC app to communicate with a particular ALEL engine to get to a particular content server, so long as the UXC app is built for the correct JSON/API for the desired ALEL engine.

With the ALEL engine acting as a proxy or gate keeper for the content server, an enterprise can retain control of their content retention policy, record management, and other business processes such as workflow, archiving, moderation, document review, etc. The CDS module can alert the ALEL engine to tell the client devices to act accordingly. For example, an enterprise may not want a document DOC sitting out there on client device(s) when it needs to be deleted or archived. The content server may send a notification (e.g., via notifier 835) "delete DOC" to the ALEL engine and the ALEL engine may notify client devices to take appropriate action. Whether or not the document gets deleted right away may vary from implementation to implementation. For example, if the document is downloaded to a mobile device and stored locally in a file cache on the mobile device, the document may get deleted next time when the mobile or client cache is refreshed or otherwise updated by the ALEL engine. The cache is managed by the ALEL engine and is specific to the ALEL engine in that the path to the document in the file system on the mobile device may not be accessible by other applications running on the mobile device. Further, the cache may be encrypted with a passcode such that the OS on the mobile device can access the caches but other applications running on the mobile device cannot. If a user of the mobile device is no longer associated with the entity which owns the document, the ALEL engine can lock the file/folder. Depending upon implementation, the actual document may not need to be downloaded from the central repository. Rather, the ALEL-specific file cache on the mobile device may store a reference to the document. So long as a client downloads a file through the ALEL-specific API, the file (in the ALEL-specific file cache) is managed by the ALEL engine (on behalf of the content server) and not by the local application running on the mobile device.

In one embodiment, there is no need to drop a token to track a file on a client device. From the perspective of the user, he or she does not have to do anything. The appropriate document gets deleted automatically per the user's company's policy. From the records management (RM) perspective, this enforcement method is much more efficient, effective and convenience for the user. The client cache can be managed remotely per RM rules and policies and the enterprise content is always available securely, even across continents. For example, different policies may apply to a document depending upon where the document is viewed on a client device. The mobile device may communicate location information to the ALEL engine (e.g., in the U.S. or Canada) and apply RM policy with respect to each country. This feature can be viewed as an extension of a repository rule, allowing consistent management of enterprise content.

Unlike a mobile client, there is no content cache for a browser client because it is a web page. In this case, the ALEL engine may synchronize each file accessed by the browser client to a folder. For a desktop client, the ALEL engine may provide a file to a file system on the desktop client and place it in a particular location of the desktop client file system. When the ALEL engine wants to act on the file, it goes to that particular location to act on it. As a gate keeper, the ALEL engine controls access to the file and, in many cases, can get through a local file system on a client to manage and/or control the local version of the file.

In one embodiment, the content server may have a token module that will track each token on a client device indicating that a certain version of a particular document is on a certain device a certain date and/or time. This allows the content server to implement document versioning control. So, if a particular version of a document needs to be deleted, the content server will know which client devices to notify for deletion.

The content server knows from audit trail, activity trail, repository, etc. if a file is sent to a device. In one embodiment, a UXC app running on a client device may have a database storing information such as document ID, repository of records, modify date, permission, file hash (to do repair), etc. When content is modified on one of the client devices, the modified data is stored in the content server and all interested client devices are notified of the change. Clients can then download the updated content from the content server. All changes to content on any client trigger notifications to all other clients of the modification so that they either perform the same operation locally or download the updated content from the content server. A "Sharing" feature of the UXC app may allow users to give access to specific folders to selected users, ensuring that all interested parties are notified of any content changes.

As described above, the ALEL engine can be implemented as the only public-facing proxy outside of the firewall of an enterprise computing environment. In this way, the ALEL engine can act as a secure point in which everything behind the firewall is protected. From the security perspective, the ALEL engine can be an important component of a content sharing and synchronizing system. Additionally, the ALEL engine can offload some of the functions normally provided by the server(s) in the enterprise computing environment. For example, the ALEL engine may also validate (authenticate) a request from a client machine and create a secure connection between the client machine and itself. One example secure connection may be a HTTPS connection. Other types of secure connections may also be possible. For example, the ALEL engine may utilize 256-bit Secure Sockets Layer (SSL) encrypted communications when communicating with web browsers to ensure that no traffic in transit can be seen, or "sniffed", by network traffic monitoring tools. As with all web browser interface experiences; local caching, history and file storage is governed by the settings within the browser being used. Companies with browser-based security concerns may mandate specific browser types and versions, and may have centralized system management tools in place to control local browser settings. As those skilled in the art will appreciate, since all other components in the enterprise computing environment are protected behind the firewall, communications among the protected components can occur in a secure manner. Content stored in a central repository is governed by access permissions, automated classification, retention policies, and file storage policies applicable to the enterprise computing environment. All content, including versions, metadata, audit history, and so on can be saved within specific long-term retention and disposition policies.

Embodiments described above allow companies and the like to quickly set up a private solution for sharing and syncing information across multiple devices, combining consumer-level usability with enterprise-level reliability and security. For enterprise users, the experience and functionality is similar to file sharing cloud services with full desktop integration and easy access to synchronized content from mobile apps on user devices. While the user experience does not change, all the content is actually being stored behind the company firewall with a full audit trail of all content access, modification, sharing, and synchronization activity; versioning history with a listing of all versions, complete with user notes for any modifications to each version or sub-version; retention policies with predefined rules about how long and where information is kept; discovery control to easily find information when necessary; and permission control on who in an organization can read, edit, share, or even see business content. Embodiments can thus provide:

transparent integration into enterprise user desktops, including sharing with internal and external users;

intuitive user experience across the Web, desktop computers and mobile devices;

the ability to synchronize enterprise content across any number of computers, tablets, and other devices, ensuring that enterprise users always have the latest copy of documents;

a simple Web interface for managing file information, setting permissions or sharing files;

a flexible deployment model that allows companies and the like to manage their content sharing and syncing system entirely on-premises or choose a hybrid model that allows companies to maintain control of the information at the CDS layer but offload the effort of maintaining the content sharing and syncing service to the ALEL layer.

Figure 9:
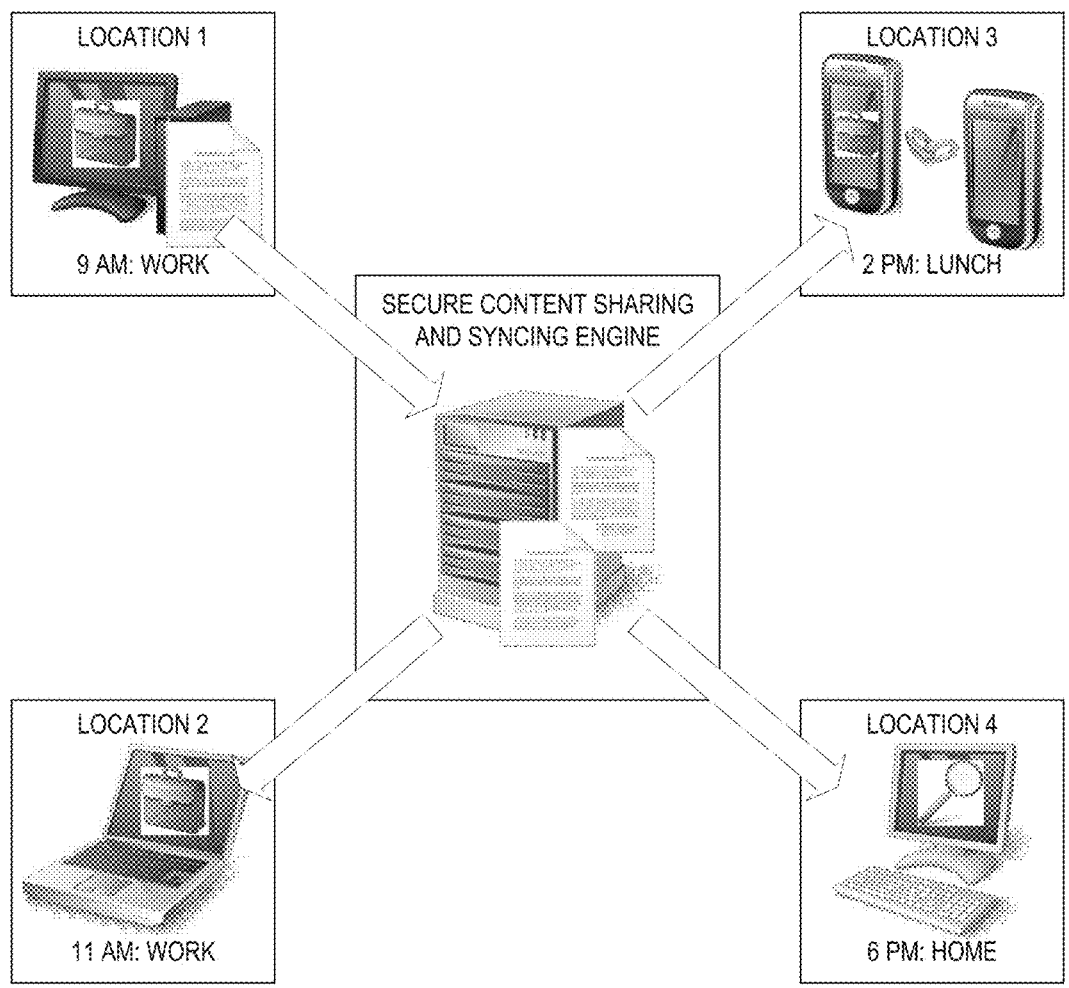
FIG. 9 depicts a diagrammatic representation of an example of content sharing and synchronization utilizing the system of FIG. 8.

To illustrate these features, below provides an example day in the life of an enterprise knowledge worker "John" utilizing one embodiment of system 800. Referring to FIG. 9, at 9 AM, John may be at a standalone work station at his company creating a document and saving the document using a word processing application. When the document is saved, the word processing application automatically sends it to an enterprise content management (ECM) server. John's work station may or may not cache the document locally in a folder. As described above, there is no difference in the user experience environment. However, behind the scene the client application (the word processing application) is dissociated from the ECM. The ECM and the client application do not know how to communicate directly with each other. Rather, the client application communicates, via an API, with a secure content sharing and syncing engine (content engine) which has or talks to a content module which, in turn, communicates with the ECM in an ECM-specific language.

At 11 AM, John attends a collaboration meeting reviewing the document that he had created earlier on a laptop with his colleagues. The client application which was used to create the document can be used to retrieve from the ECM and present the document on the laptop and/or project it on a screen. The client application can relate any change made to the document via the laptop to the ECM as described above. Again, John's laptop may or may not cache the document locally in a content folder.

At 2 PM, while at lunch John shows another colleague the document that he had been working on at 9 AM and collaborated with other colleagues at 11 AM by bringing up the document or a rendition of the document (e.g., a copy or a HTML view of the document) on John's mobile device. Any update to the document made via the mobile device is correspondingly made at the backend (at the ECM) and viewable by other devices back at the office as well. John's mobile device may or may not cache the document locally in a content folder.

At 6 PM, John is at home at his own computer and wants to add a paragraph to the document that he has been working on all day. Using a Web browser, John can dynamically and conveniently download a Web interface of the ECM via dissociated UXC, ALEL, and CDS payloads as described above and download the document manually, interactively make the change to the document, and upload the document again interactively. The ECM keeps the version history of the document.

In this example, there are three applications at work here. The computers that John used at two different locations at 9 AM and 11 AM are work computers. The first application in this case is a background service that performs synchronization and therefore has very minimal application logic. On the mobile devices, the second application is a content sharing and synchronization system for making a request to the ECM to get metadata about the document and optionally download the document as well. On the home computer, the third application is a browser-based application built in the HTML and Java script that runs on a browser that has all kind of logic for building the Web interface and presenting the Web interface to the user to then make a request back to the server. These are three different applications in a system architecture disclosed herein that can all be built, distributed, and updated independently of the ECM system and can be hosted outside of the ECM system as well.

So, the mobile device and the home computer can have network based applications conveniently deployed when needed. As described above, the UXC, ALEL, and CDS layers can be dissociated logically and physically. In some embodiments, the UXC, ALEL, and CDS layers can be dissociated logically but not necessarily physically. For example, in one embodiment, the content engine may reside on an application server and serve as an interface between the UI and the ECM for all content and user devices. As another example, in one embodiment, the content engine may reside on client devices to interface with the UI, but may have nothing to do with a client application used to create a document on the client device. The logical dissociation and, in some embodiments, the physical dissociation among the UXC, ALEL, and CDS layers allow enterprise users to access enterprise content from virtually anywhere, via any device, at any time and make it easy for them to securely share the content with other people, while allowing the owner of the content to retain control and management of the content. Further, the logical dissociation among the UXC, ALEL, and CDS layers allows entities to update the user experience environments and/or client applications at the client devices without affecting the ECM, and vice versa.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by, for example, using distributed, or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A device, comprising:
   at least one processor;
   non-transitory computer memory; and
   stored instructions translatable by the at least one processor for:
   responsive to a user interacting with a browser application running on the device, requesting a cloud-based user interface from a user experience server, the user experience server communicatively connected to the device over a network;
   receiving, from the user experience server, user experience component information for the cloud-based user interface and location information for an application server or cloud infrastructure or on the device;
   utilizing the location information from the user experience server to request or retrieve application and execution logic from the application server, the cloud infrastructure, or a location on the device;
   receiving or obtaining, from the application server, the cloud infrastructure, or the location on the device, the application and execution logic and location information for a content server;
   interacting with the content server utilizing the location information for the content server received or retrieved from the application server, the cloud infrastructure, or the location on the device;
   forming a cloud-based application utilizing the user experience component information for the cloud-based user interface from the user experience server and the application and execution logic from the application server, the cloud infrastructure, or the location on the device such that the cloud-based application comprises the cloud-based user interface with the user experience component information from the user experience server and the application and execution logic from the application server, the cloud infrastructure, or the location on the device;
   providing a run-time environment for running the application and execution logic of the cloud-based application within the browser application on the device; and
   displaying data managed by the content server through the cloud-based user interface of the cloud-based application running in the run-time environment provided by the browser application on the device.

2. The device of claim 1, wherein the stored instructions are further translatable by the at least one processor for:
   receiving or obtaining, from the user experience server, an update or upgrade for the cloud-based user interface of the cloud-based application; and
   updating or upgrading the cloud-based user interface of the cloud-based application using the update or upgrade from the user experience server, without affecting the application and execution logic of the cloud-based application or the data managed by the content server.

3. The device of claim 2, wherein the update or upgrade for the cloud-based user interface of the cloud-based application is triggered by user interaction with the cloud-based user interface of the cloud-based application.

4. The device of claim 2, wherein the stored instructions are further translatable by the at least one processor for:
   re-rendering the cloud-based user interface of the cloud-based application on the device without making a request to the application server, the cloud infrastructure, or the content server.

5. The device of claim 1, wherein the cloud-based user interface of the cloud-based application comprises a branded user interface for a first entity and wherein the application and execution logic is provided by a second entity.

6. The device of claim 5, wherein the content server is hosted by a third entity.

7. The device of claim 1, wherein the stored instructions are further translatable by the at least one processor for:
   deleting the cloud-based user interface, the application and execution logic, and the data managed by the content server from the device when the browser application or a web page in the browser application implementing the cloud-based application is closed.

8. A method, comprising:
   responsive to a user interacting with a browser application running on a user device, requesting, by the user device, a cloud-based user interface from a user experience server, the user experience server communicatively connected to the user device over a network;
   receiving, by the user device from the user experience server, user experience component information for the cloud-based user interface and location information for an application server or cloud infrastructure or on the user device;
   utilizing, by the user device, the location information from the user experience server to request or retrieve application and execution logic from the application server, the cloud infrastructure, or a location on the user device;
   receiving or retrieving, by the user device from the application server, the cloud infrastructure, or the location on the user device, the application and execution logic and location information for a content server;

interacting with the content server utilizing the location information for the content server received or retrieved from the application server, the cloud infrastructure, or the location on the user device;

forming a cloud-based application utilizing the user experience component information for the cloud-based user interface from the user experience server and the application and execution logic from the application server, the cloud infrastructure, or the location on the user device such that the cloud-based application comprises the cloud-based user interface with the user experience component information from the user experience server and the application and execution logic from the application server, the cloud infrastructure, or the location on the device;

providing a run-time environment for running the application and execution logic of the cloud-based application within the browser application on the device; and displaying data managed by the content server through the cloud-based user interface of the cloud-based application running in the run-time environment provided by the browser application on the device.

9. The method according to claim 8, further comprising:
receiving or obtaining, from the user experience server, an update or upgrade for the cloud-based user interface of the cloud-based application; and
updating or upgrading the cloud-based user interface of the cloud-based application using the update or upgrade from the user experience server, without affecting the application and execution logic of the cloud-based application or the data managed by the content server.

10. The method according to claim 9, wherein the update or upgrade for the cloud-based user interface of the cloud-based application is triggered by user interaction with the cloud-based user interface of the cloud-based application.

11. The method according to claim 9, further comprising:
re-rendering the cloud-based user interface of the cloud-based application on the device without making a request to the application server, the cloud infrastructure, or the content server.

12. The method according to claim 8, wherein the cloud-based user interface of the cloud-based application comprises a branded user interface for a first entity and wherein the application and execution logic is provided by a second entity.

13. The method according to claim 8, wherein the content server is hosted by a third entity.

14. The method according to claim 8, further comprising:
deleting the cloud-based user interface, the application and execution logic, and the data managed by the content server from the device when the browser application or a web page in the browser application implementing the cloud-based application is closed.

15. A computer program product comprising a non-transitory computer readable medium storing instructions translatable by a processor of a device for:
responsive to a user interacting with a browser application running on the device, requesting a cloud-based user interface from a user experience server, the user experience server communicatively connected to the device over a network;
receiving, from the user experience server, user experience component information for the cloud-based user interface and location information for an application server or cloud infrastructure or on the device;
utilizing the location information from the user experience server to request or retrieve application and execution logic from the application server, the cloud infrastructure, or a location on the device;
receiving or obtaining, from the application server, the cloud infrastructure, or the location on the device, the application and execution logic and location information for a content server;
interacting with the content server utilizing the location information for the content server received or retrieved from the application server, the cloud infrastructure, or the location on the device;
forming a cloud-based application utilizing the user experience component information for the cloud-based user interface from the user experience server and the application and execution logic from the application server, the cloud infrastructure, or the location on the device such that the cloud-based application comprises the cloud-based user interface with the user experience component information from the user experience server and the application and execution logic from the application server, the cloud infrastructure, or the location on the device;
providing a run-time environment for running the application and execution logic of the cloud-based application within the browser application on the device; and
displaying data managed by the content server through the cloud-based user interface of the cloud-based application running in the run-time environment provided by the browser application on the device.

16. The computer program product of claim 15, wherein the instructions are further translatable by the processor for:
receiving or obtaining, from the user experience server, an update or upgrade for the cloud-based user interface of the cloud-based application; and
updating or upgrading the cloud-based user interface of the cloud-based application using the update or upgrade from the user experience server, without affecting the application and execution logic of the cloud-based application or the data managed by the content server.

17. The computer program product of claim 16, wherein the update or upgrade for the cloud-based user interface of the cloud-based application is triggered by user interaction with the cloud-based user interface of the cloud-based application.

18. The computer program product of claim 15, wherein the cloud-based user interface of the cloud-based application comprises a branded user interface for a first entity and wherein the application and execution logic is provided by a second entity.

19. The computer program product of claim 18, wherein the content server is hosted by a third entity.

20. The computer program product of claim 15, wherein the instructions are further translatable by the processor for:
deleting the cloud-based user interface, the application and execution logic, and the data managed by the content server from the device when the browser application or a web page in the browser application implementing the cloud-based application is closed.

* * * * *